(12) United States Patent
Louison et al.

(10) Patent No.: US 12,496,546 B2
(45) Date of Patent: Dec. 16, 2025

(54) FILTER ELEMENT WITH CLOSED ENDCAP FORMING A SEAL POSITIONED AT DIFFERENT AXIAL DISTANCES

(71) Applicant: Cummins Filtration Inc., Nashville, TN (US)

(72) Inventors: Matt Louison, McFarland, WI (US); Robert A. Bannister, Ames, IA (US); Daniel Potratz, Stoughton, WI (US)

(73) Assignee: Cummins Filtration Inc., Nashville, TN (US)

( * ) Notice: Subject to any disclaimer, the term of this patent is extended or adjusted under 35 U.S.C. 154(b) by 517 days.

(21) Appl. No.: 17/918,280

(22) PCT Filed: Apr. 9, 2021

(86) PCT No.: PCT/US2021/026608
§ 371 (c)(1),
(2) Date: Oct. 11, 2022

(87) PCT Pub. No.: WO2021/211378
PCT Pub. Date: Oct. 21, 2021

(65) Prior Publication Data
US 2023/0166207 A1 Jun. 1, 2023

Related U.S. Application Data

(60) Provisional application No. 63/009,824, filed on Apr. 14, 2020.

(51) Int. Cl.
*B01D 46/24* (2006.01)
*B01D 46/00* (2022.01)
(Continued)

(52) U.S. Cl.
CPC ..... *B01D 46/2414* (2013.01); *B01D 46/0004* (2013.01); *B01D 46/4227* (2013.01);
(Continued)

(58) Field of Classification Search
CPC ............ B01D 46/2414; B01D 46/0004; B01D 46/4227; B01D 2265/027;
(Continued)

(56) References Cited

U.S. PATENT DOCUMENTS 3,745,753 A 7/1973 Risse
3,928,007 A 12/1975 Jackson
(Continued)

FOREIGN PATENT DOCUMENTS

CN 1647845 A 8/2005
CN 2855503 Y 1/2007
(Continued)

OTHER PUBLICATIONS

Second Office Action issued for Chinese Patent Application No. 202080075668.6 issued Jan. 18, 2024, 10 pages.
(Continued)

*Primary Examiner* — Robert Clemente
(74) *Attorney, Agent, or Firm* — Foley & Lardner LLP

(57) ABSTRACT

An air cleaner assembly comprises a housing and a filter element. The housing comprises a first housing end and a second housing end. The second housing end of the housing defines an opening of the housing for fluid flow. The filter element is configured to be received through the first housing end of the housing. The filter element comprises a filter media and a closed endplate. The filter media comprises a first media end and a second media end. The second media end of the filter media defines an opening of the filter element for fluid flow. The closed endplate is positioned along the first media end of the filter media and comprises a wall with an axially inner surface and an axially outer surface. The axially outer surface is exposed to an area
(Continued)

outside of the housing and closes off the first housing end of the housing when the filter element is positioned within the housing.

20 Claims, 17 Drawing Sheets

(51) Int. Cl.
  *B01D 46/42* (2006.01)
  *B01D 46/64* (2022.01)

(52) U.S. Cl.
  CPC ........ *B01D 46/64* (2022.01); *B01D 2265/027* (2013.01); *B01D 2265/028* (2013.01); *B01D 2271/022* (2013.01); *B01D 2271/027* (2013.01)

(58) Field of Classification Search
  CPC .......... B01D 2265/028; B01D 2271/02; B01D 2271/022; B01D 2271/025; B01D 2271/027
  See application file for complete search history.

(56) References Cited

U.S. PATENT DOCUMENTS

| | | | |
|---|---|---|---|
| 4,162,905 A | 7/1979 | Schuler | |
| 5,244,755 A | 9/1993 | Benoist et al. | |
| 5,258,127 A | 11/1993 | Gsell et al. | |
| 5,295,602 A | 3/1994 | Swanson | |
| 5,315,483 A | 5/1994 | Tracy | |
| 5,545,241 A | 8/1996 | Vanderauwera et al. | |
| 5,547,480 A | 8/1996 | Coulonvaux | |
| 5,556,440 A | 9/1996 | Mullins et al. | |
| 5,730,769 A | 3/1998 | Dungs et al. | |
| 5,891,337 A | 4/1999 | Keller et al. | |
| 5,893,937 A | 4/1999 | Moessinger | |
| 5,919,279 A | 7/1999 | Merritt et al. | |
| 5,938,804 A | 8/1999 | Engel et al. | |
| 6,039,778 A | 3/2000 | Coulonvaux | |
| 6,051,042 A | 4/2000 | Coulonvaux | |
| 6,146,527 A | 11/2000 | Oelschlaegel | |
| 6,152,979 A | 11/2000 | Cappuyns | |
| 6,152,996 A | 11/2000 | Linnersten et al. | |
| 6,334,887 B1 | 1/2002 | Coulonvaux | |
| 6,372,132 B1 | 4/2002 | Williams | |
| 6,402,798 B1 | 6/2002 | Kallsen et al. | |
| 6,419,718 B1 | 7/2002 | Klug et al. | |
| 6,436,162 B1 | 8/2002 | Wake et al. | |
| 6,599,342 B2 | 7/2003 | Andress et al. | |
| 6,623,049 B2 | 9/2003 | Shreeve et al. | |
| 6,723,148 B2 | 4/2004 | Stass | |
| 6,902,598 B2 | 6/2005 | Gunderson et al. | |
| 6,958,083 B1 | 10/2005 | Schmitz et al. | |
| 7,063,730 B2 | 6/2006 | Connor et al. | |
| 7,070,642 B2 | 7/2006 | Scott et al. | |
| 7,097,694 B1 | 8/2006 | Jaroszczyk et al. | |
| 7,125,490 B2 | 10/2006 | Clendenning et al. | |
| 7,247,183 B2 | 7/2007 | Connor et al. | |
| 7,276,098 B2 | 10/2007 | Koslow | |
| 7,282,077 B2 | 10/2007 | Honisch et al. | |
| 7,291,198 B2 | 11/2007 | Gieseke et al. | |
| 7,314,558 B1 | 1/2008 | Jaroszczyk et al. | |
| 7,323,105 B1 | 1/2008 | Janikowski et al. | |
| 7,323,106 B2 | 1/2008 | Jaroszczyk et al. | |
| 7,413,588 B2 | 8/2008 | Holzmann et al. | |
| 7,537,631 B2 | 5/2009 | Scott et al. | |
| 7,540,895 B2 | 6/2009 | Furseth et al. | |
| 7,563,300 B2 | 7/2009 | Nishiyama et al. | |
| D600,790 S | 9/2009 | Nelson et al. | |
| 7,625,419 B2 | 12/2009 | Nelson et al. | |
| 7,645,546 B2 | 1/2010 | Yang et al. | |
| 7,658,777 B2 | 2/2010 | Kopec et al. | |
| 7,662,203 B2 | 2/2010 | Scott et al. | |
| 7,662,216 B1 | 2/2010 | Terres et al. | |
| 7,740,678 B2 | 6/2010 | Gunderson et al. | |
| 7,753,982 B2 | 7/2010 | Merritt et al. | |
| RE41,713 E | 9/2010 | Gunderson et al. | |
| 7,789,926 B2 | 9/2010 | Rieger et al. | |
| 7,799,108 B2 | 9/2010 | Connor et al. | |
| 7,828,870 B1 | 11/2010 | Rech et al. | |
| 7,879,125 B2 | 2/2011 | Haberkamp et al. | |
| RE42,174 E | 3/2011 | Gunderson et al. | |
| 7,931,725 B2 | 4/2011 | Wydeven et al. | |
| 7,959,703 B2 | 6/2011 | Merritt et al. | |
| 7,976,601 B2 | 7/2011 | Xu et al. | |
| 7,976,602 B2 | 7/2011 | Munkel | |
| 7,981,183 B2 | 7/2011 | Nepsund et al. | |
| 7,981,186 B2 | 7/2011 | Schrage et al. | |
| 7,988,757 B2 | 8/2011 | Scott et al. | |
| 7,993,422 B2 | 8/2011 | Krisko et al. | |
| 8,038,756 B2 | 10/2011 | Iddings et al. | |
| 8,097,061 B2 | 1/2012 | Smith et al. | |
| 8,163,057 B2 | 4/2012 | Blossey et al. | |
| 8,177,874 B2 | 5/2012 | Bittle et al. | |
| 8,177,971 B2 | 5/2012 | Bittle et al. | |
| 8,216,335 B2 | 7/2012 | Scott et al. | |
| 8,286,804 B2 | 10/2012 | Weindorf | |
| 8,394,166 B2 | 3/2013 | Scott | |
| 8,460,425 B2 | 6/2013 | Scott et al. | |
| 8,545,588 B2 | 10/2013 | Iddings et al. | |
| 8,828,114 B2 | 9/2014 | Dhiman et al. | |
| 8,828,123 B2 | 9/2014 | Holzmann et al. | |
| 9,089,804 B2 | 7/2015 | Campbell et al. | |
| 9,457,308 B2 | 10/2016 | Kaufmann et al. | |
| 9,463,404 B2 | 10/2016 | Rieger et al. | |
| 9,498,743 B2 | 11/2016 | Dhiman et al. | |
| 9,511,317 B2 | 12/2016 | Ruhland et al. | |
| 9,636,608 B2 | 5/2017 | Morris et al. | |
| 10,744,442 B1 | 8/2020 | Garside | |
| 11,136,947 B2 | 10/2021 | Von Seggern et al. | |
| 11,311,829 B2 | 4/2022 | Nelson et al. | |
| 11,426,692 B2 | 8/2022 | Louison et al. | |
| 11,633,683 B2 | 4/2023 | Louison et al. | |
| 2002/0046556 A1 | 4/2002 | Reid | |
| 2003/0184025 A1 | 10/2003 | Matsuki | |
| 2004/0035097 A1 | 2/2004 | Schlensker et al. | |
| 2004/0134171 A1 | 7/2004 | Scott et al. | |
| 2005/0193695 A1 | 9/2005 | Holmes et al. | |
| 2006/0086075 A1 | 4/2006 | Scott et al. | |
| 2007/0102343 A1 | 5/2007 | Brown et al. | |
| 2008/0190082 A1 | 8/2008 | Scott et al. | |
| 2008/0276583 A1 | 11/2008 | Munkel | |
| 2009/0057219 A1 | 3/2009 | Bagci et al. | |
| 2009/0071111 A1 | 3/2009 | Lundgren et al. | |
| 2009/0094951 A1 | 4/2009 | Baseotto et al. | |
| 2009/0126324 A1 | 5/2009 | Smith et al. | |
| 2009/0217632 A1 | 9/2009 | Coulonvaux et al. | |
| 2009/0241489 A1 | 10/2009 | Becker et al. | |
| 2009/0301950 A1 | 12/2009 | Weindorf | |
| 2010/0064646 A1 | 3/2010 | Smith et al. | |
| 2010/0146920 A1 | 6/2010 | Iddings et al. | |
| 2010/0258493 A1 | 10/2010 | Kindkeppel et al. | |
| 2012/0060453 A1 | 3/2012 | Holzmann et al. | |
| 2012/0067014 A1 | 3/2012 | Dhiman et al. | |
| 2012/0181224 A1 | 7/2012 | Rapin | |
| 2013/0037478 A1 | 2/2013 | Thomas et al. | |
| 2013/0086877 A1 | 4/2013 | Kori et al. | |
| 2013/0263744 A1 | 10/2013 | Osendorf et al. | |
| 2014/0251895 A1 | 9/2014 | Wagner | |
| 2014/0260994 A1 | 9/2014 | Grider et al. | |
| 2015/0020488 A1* | 1/2015 | Dhiman | B01D 46/0005 55/502 |
| 2015/0101298 A1 | 4/2015 | Osendorf et al. | |
| 2015/0292448 A1 | 10/2015 | Campbell et al. | |
| 2016/0074801 A1 | 3/2016 | Francis | |
| 2016/0136562 A1 | 5/2016 | Nepsund et al. | |
| 2016/0332103 A1 | 11/2016 | Marks et al. | |
| 2017/0021291 A1 | 1/2017 | Morris et al. | |
| 2018/0156087 A1* | 6/2018 | Lundgren | B01D 46/009 |
| 2018/0339253 A1* | 11/2018 | Karlsson | B01D 46/0005 |
| 2020/0164299 A1* | 5/2020 | Louison | B01D 35/30 |

(56) References Cited

U.S. PATENT DOCUMENTS

2020/0238202 A1 7/2020 Renz et al.
2021/0069631 A1 3/2021 Neef et al.

FOREIGN PATENT DOCUMENTS

| | | |
|---|---|---|
| CN | 101048215 A | 10/2007 |
| CN | 201357024 Y | 12/2009 |
| CN | 101952010 A | 1/2011 |
| CN | 102350151 A | 2/2012 |
| CN | 102527163 A | 7/2012 |
| CN | 103025405 A | 4/2013 |
| CN | 103442782 A | 12/2013 |
| CN | 103635244 | 3/2014 |
| CN | 103732303 A | 4/2014 |
| CN | 103982343 A | 8/2014 |
| CN | 103987437 A | 8/2014 |
| CN | 104028060 B | 9/2014 |
| CN | 104415619 A | 3/2015 |
| CN | 104421062 A | 3/2015 |
| CN | 104421063 A | 3/2015 |
| CN | 204419408 U | 6/2015 |
| CN | 204611988 U | 9/2015 |
| CN | 105263600 A | 1/2016 |
| CN | 105324572 A | 2/2016 |
| CN | 205173132 U | 4/2016 |
| CN | 105658944 A | 6/2016 |
| CN | 105840363 A | 8/2016 |
| CN | 106413841 A | 2/2017 |
| CN | 206381744 U | 8/2017 |
| CN | 207445816 U | 6/2018 |
| CN | 109289335 A | 2/2019 |
| CN | 109906109 A | 6/2019 |
| CN | 111757776 B | 10/2020 |
| DE | 10 2014 012 948 | 6/2015 |
| DE | 10 2016 000 575 A1 | 8/2016 |
| EP | 0 723 800 A1 | 7/1996 |
| EP | 1 769 835 A2 | 4/2007 |
| EP | 2 227 306 B1 | 9/2010 |
| EP | 2 742 986 A1 | 6/2014 |
| JP | H06-085007 U | 12/1994 |
| TW | 428670 U | 4/2001 |
| WO | WO-02/31340 A1 | 4/2002 |
| WO | WO-2004/039476 A1 | 5/2004 |
| WO | WO-2006/026241 A1 | 3/2006 |
| WO | WO-2008/124437 A2 | 10/2008 |
| WO | WO-2009/019443 A1 | 2/2009 |
| WO | WO-2016/040016 A1 | 3/2016 |
| WO | WO-2017/079191 A1 | 5/2017 |
| WO | WO-2018/156489 A1 | 8/2018 |
| WO | WO-2019/018465 A1 | 1/2019 |
| WO | WO-2019/140045 A1 | 7/2019 |

OTHER PUBLICATIONS

Second Office Action issued for Chinese Patent Application No. 202180027209.5 issued Feb. 1, 2024.
Final Office Action for U.S. Appl. No. 14/453,084 dated May 25, 2016, 10 pages.
First Examination Report for Indian Patent Application No. 2835/KOLNP/2012 dated Jul. 17, 2018, 9 pages.
Fist Office Action for Chinese Patent App. No. 201180030354.5 dated Apr. 18, 2014, 36 pages (with translation).
Foreign Action other than Search Report on CN 2018800481949 dtd Apr. 28, 2021.
Foreign Action other than Search Report on CN 201980012052.1 dtd Jun. 25, 2021.
Foreign Action other than Search Report on IN 201838035652 dtd Feb. 17, 2021.
Foreign Action other than Search Report on IN 202047033457 dtd Mar. 15, 2021.
Foreign Action other than Search Report on IN 202247023311 dtd Jun. 22, 2022.
International Search Report & Written Opinion for PCT/US11/51880 dated Feb. 2, 2012, 7 pages.
International Search Report and Written Opinion for PCT Application No. PCT/US2020/059838, dated Mar. 18, 2021.
International Search Report and Written Opinion issued for PCT Application No. PCT/US2021/026608 issued Sep. 1, 2021.
International Search Report and Written Opinion issued for PCT/US2018/042589, issued Sep. 25, 2018, 14 pages.
International Search Report and Written Opinion issued for PCT/US2019/012985, issued Mar. 27, 2019, 10 pages.
Non-Final Office Action on U.S. Appl. No. 16/961,176 dtd Mar. 17, 2022.
Office Action for Brazilian Patent App. No. 1120120252518 dated Feb. 12, 2019, 8 pages (with translation).
Office Action for U.S. Appl. No. 13/234,309 dated Jan. 27, 2014, 11 pages.
Office Action for U.S. Appl. No. 14/453,084 dated Jan. 14, 2016, 7 pages.
US Office Action on U.S. Appl. No. 16/631,974 dtd Aug. 19, 2021.
Non-Final Office Action on U.S. Appl. No. 17/836,215 issued Sep. 14, 2023.
Non-Final Office Action on U.S. Appl. No. 18/132,056 issued Nov. 6, 2023.
First Office Action issued for Chinese Patent Application No. 202080075668.6 issued Jun. 5, 2023, 11 pages.
Notice of Allowance issued for U.S. Appl. No. 17/776,445 issued Jan. 15, 2025.
Third Office Action issued for Chinese Patent Application No. 202180027209.5 issued Jan. 24, 2025.
Non-Final Office Action issued for U.S. Appl. No. 17/776,445 issued Aug. 1, 2024.
Partial Supplementary European Search Report issued for European Patent Application No. 21789544.0, issued May 7, 2024.
Supplemental Search Report issued for European Patent Application No. 21789544.0, issue Jul. 31, 2024.
First Office Action issued for Chinese Patent Application No. 202210037902.7, issued Dec. 9, 2023, 5 pages.
Office Action issued for Indian Patent Application No. issued Dec. 19, 2022, 6 pages.
Office Action issued for Chinese Patent Application No. 202080075668.6 issued Apr. 24, 2024.

\* cited by examiner

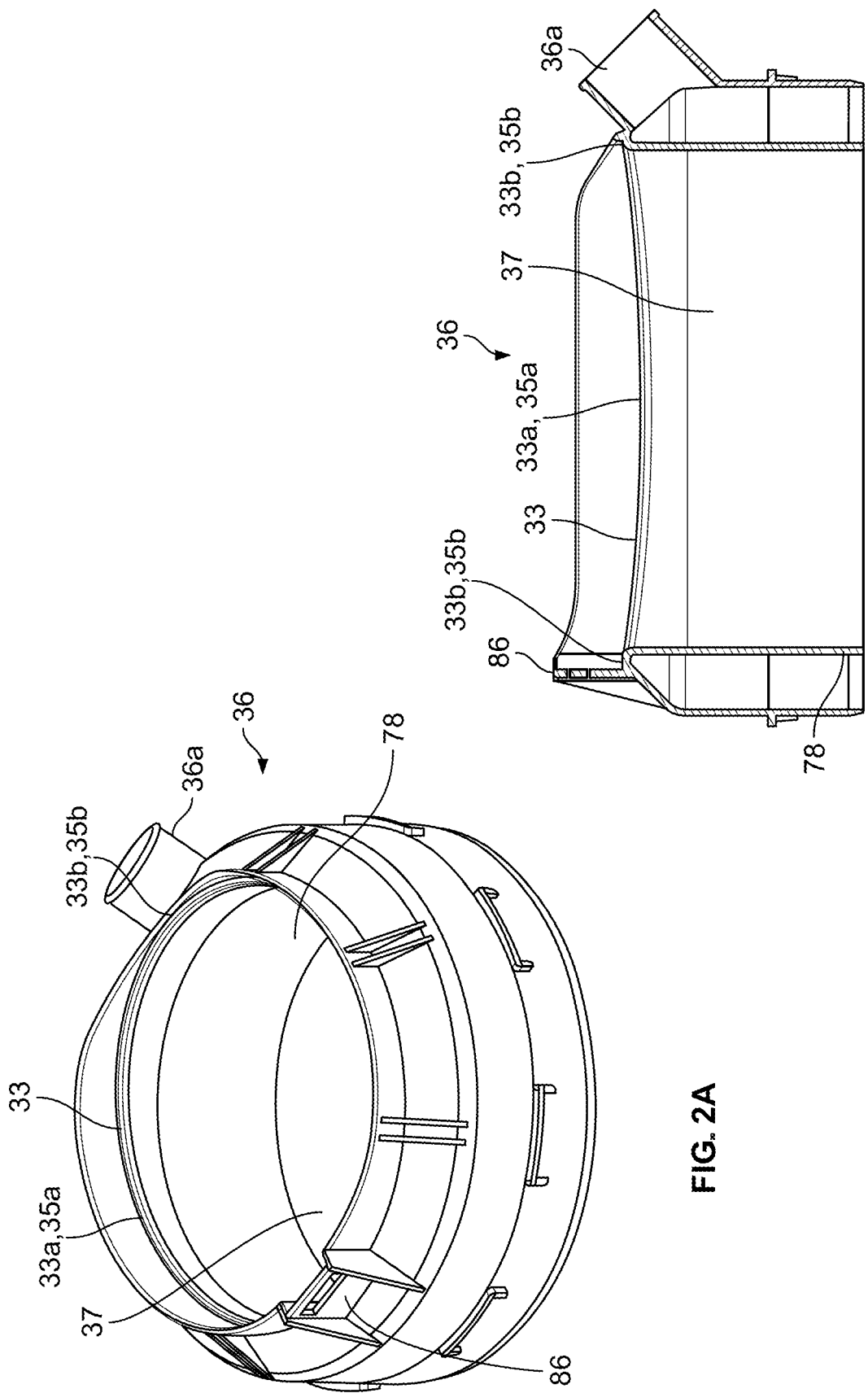

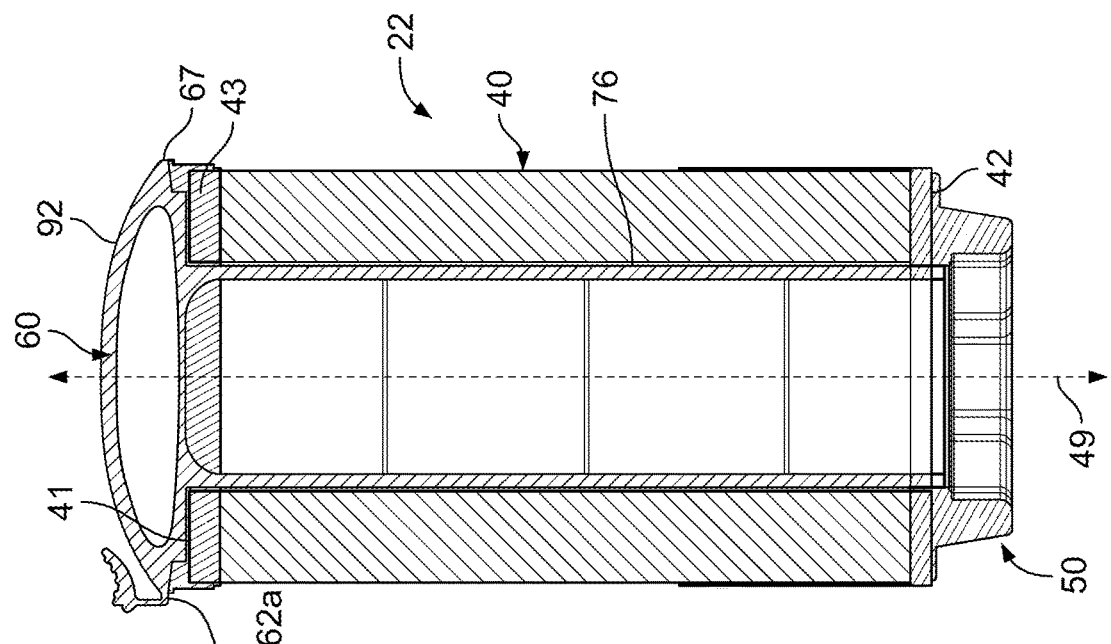
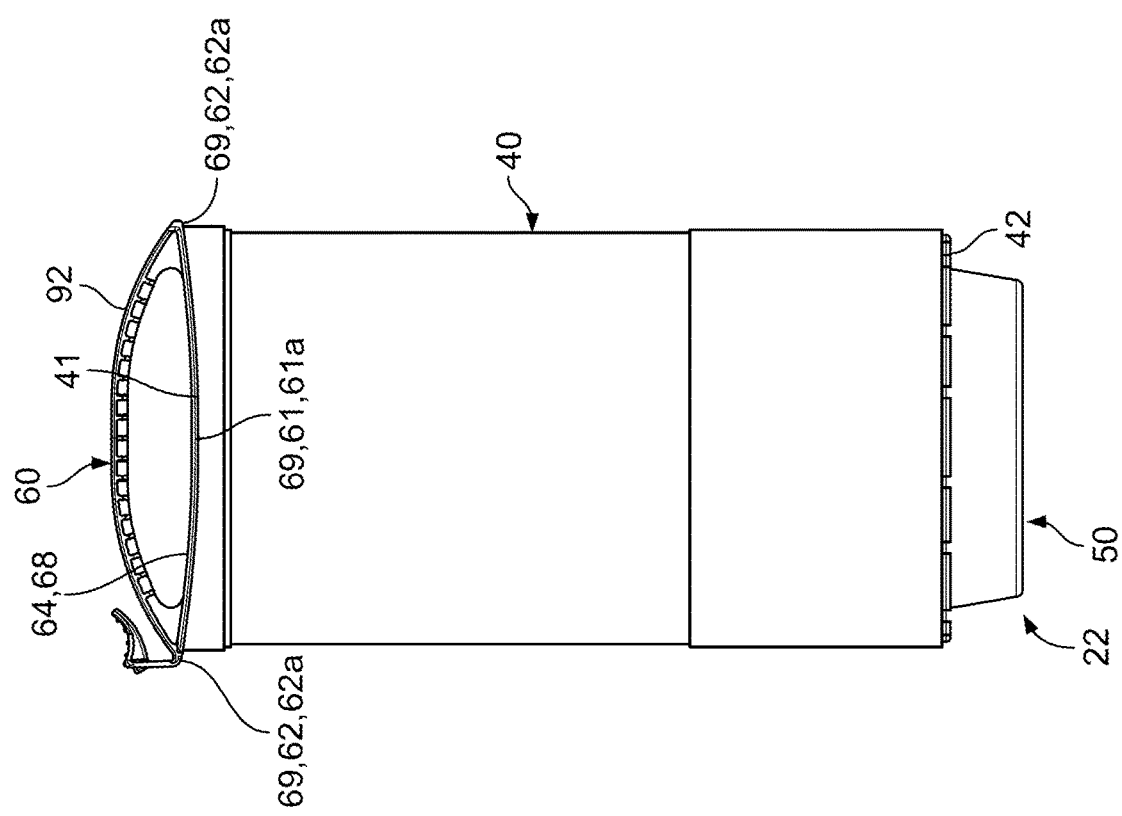
FIG. 3C
FIG. 3B

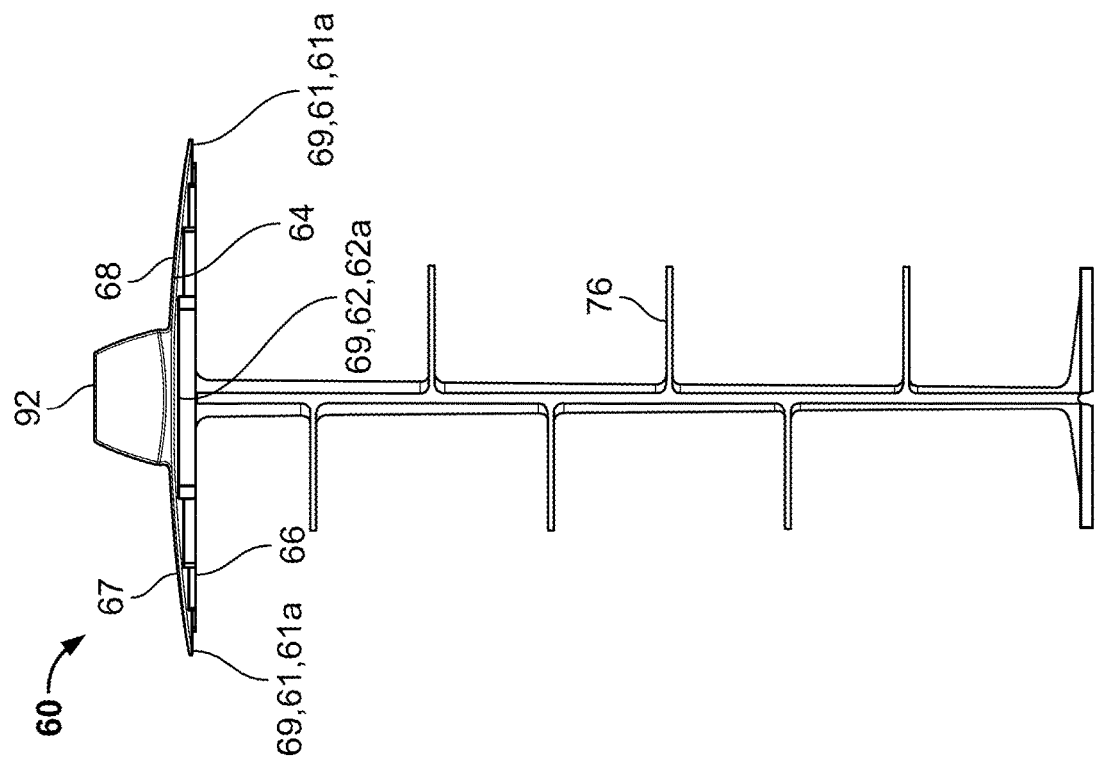
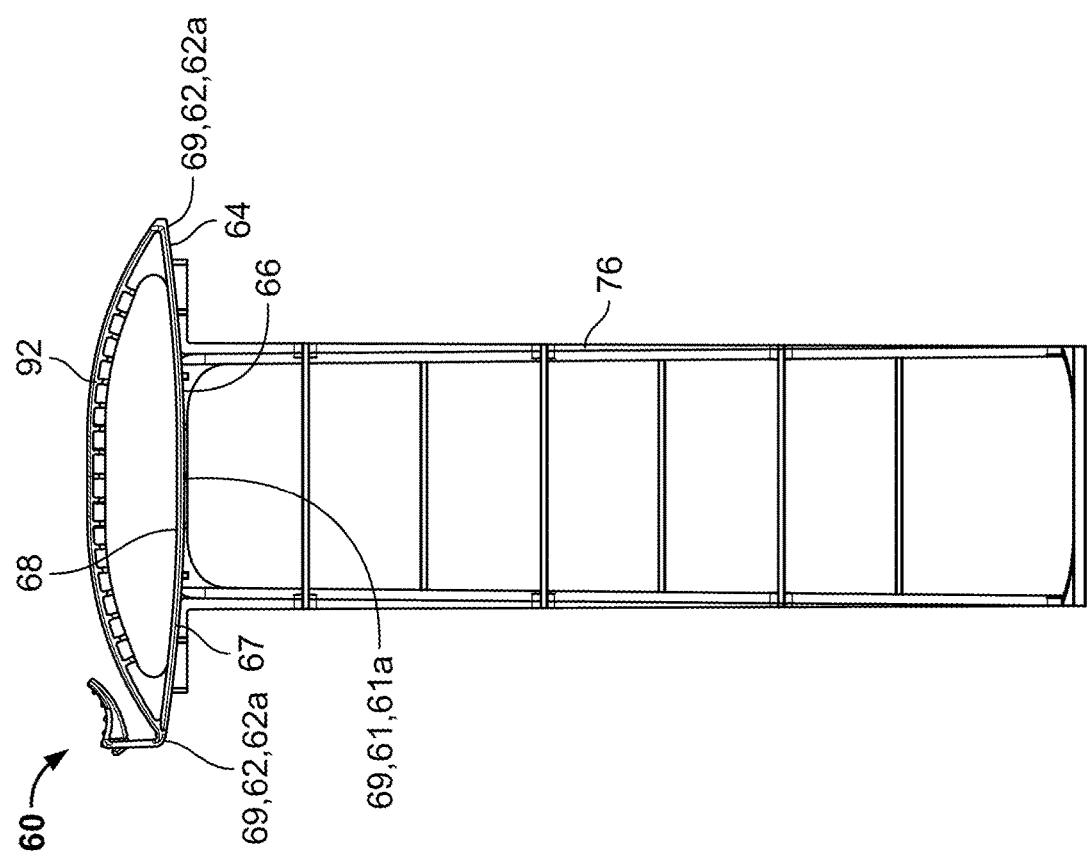

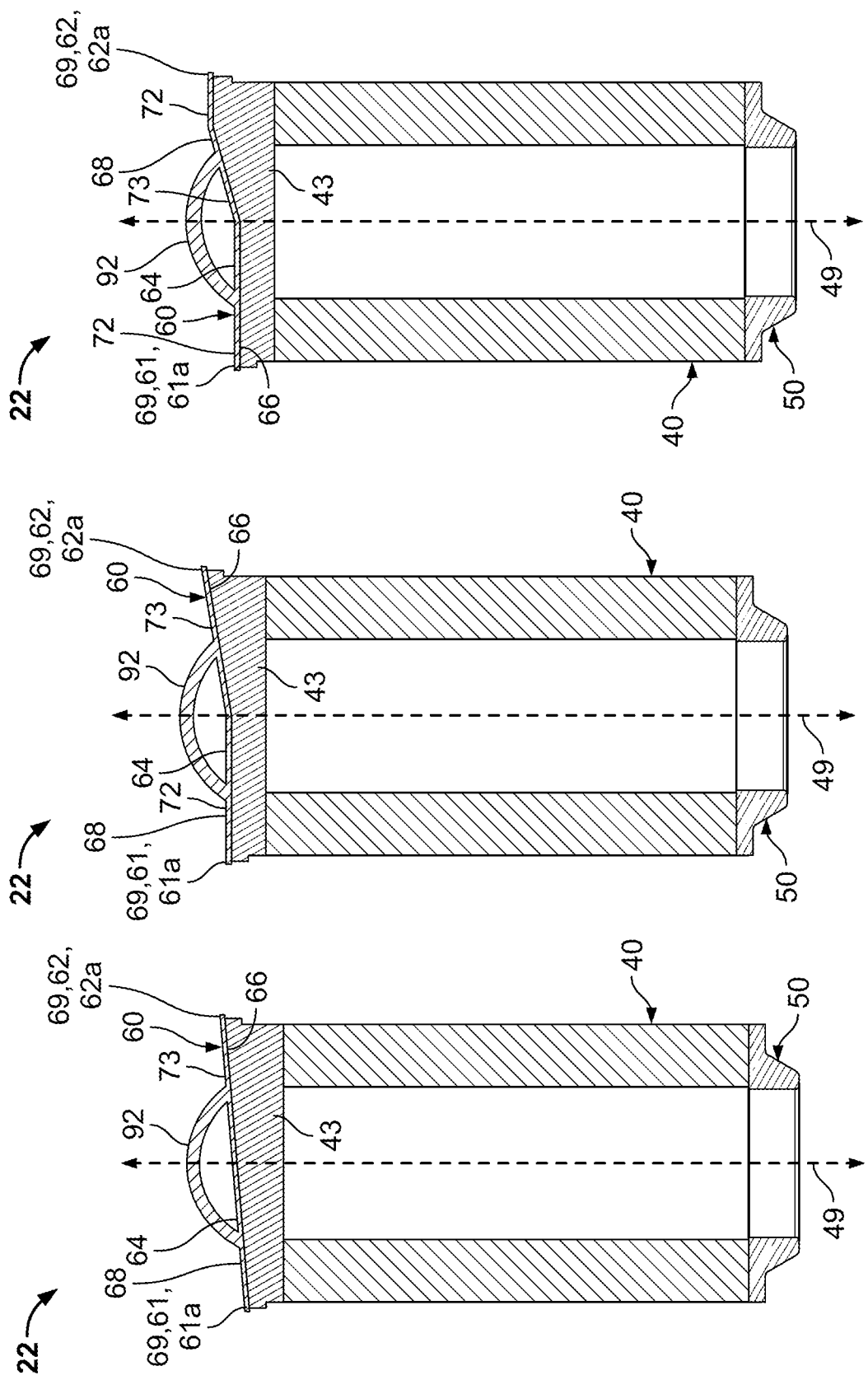

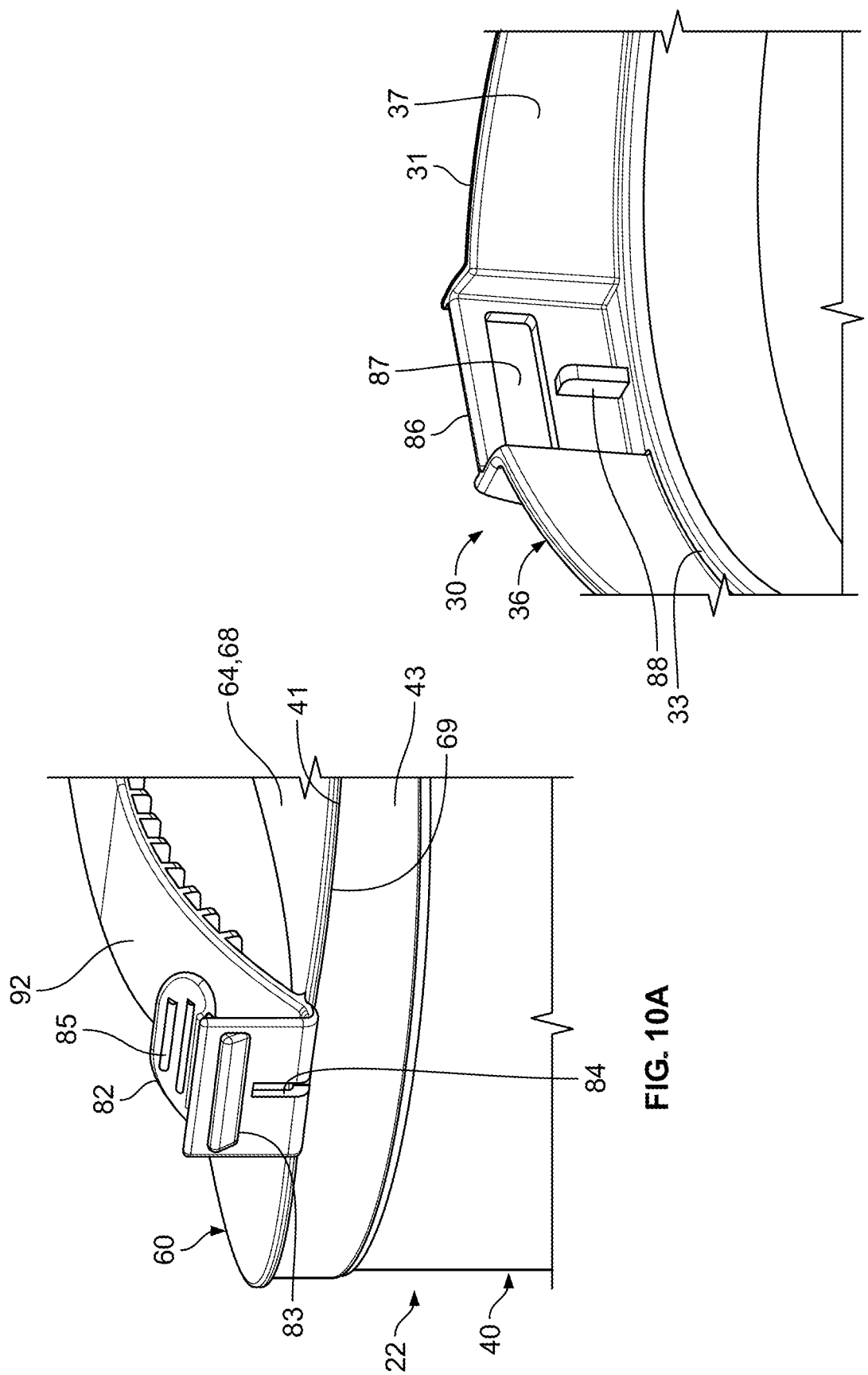

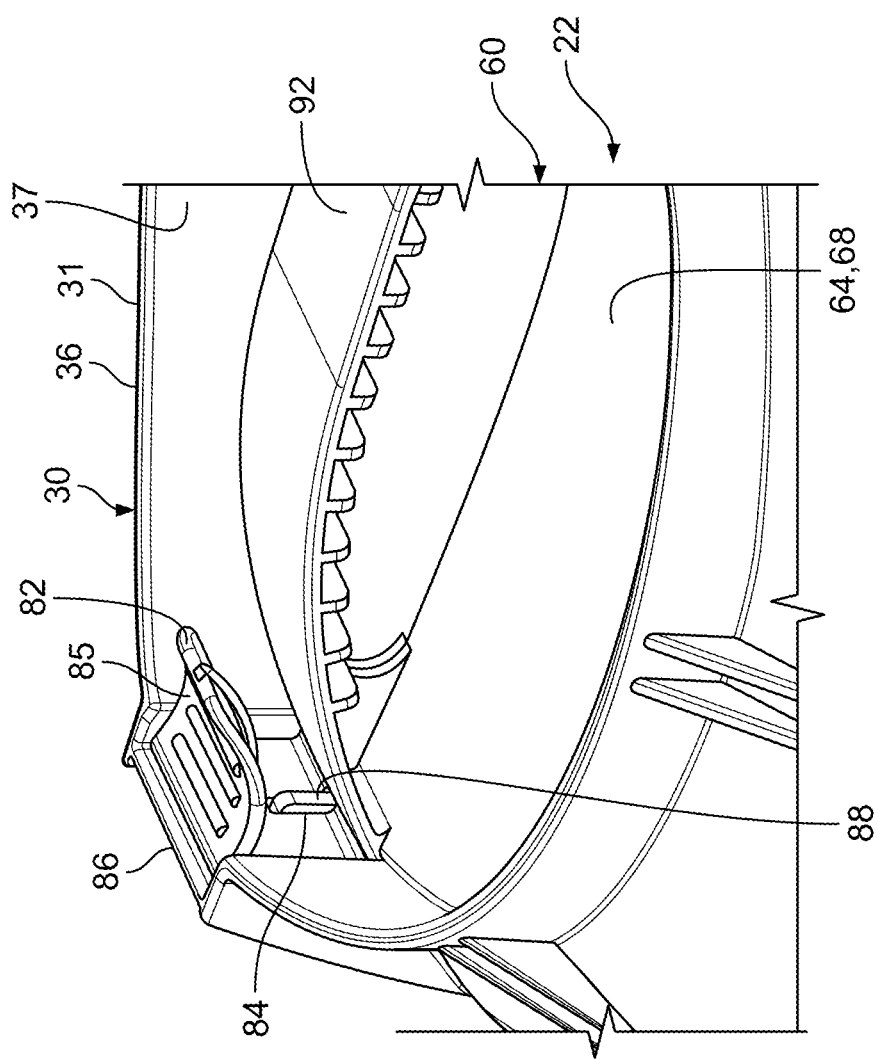

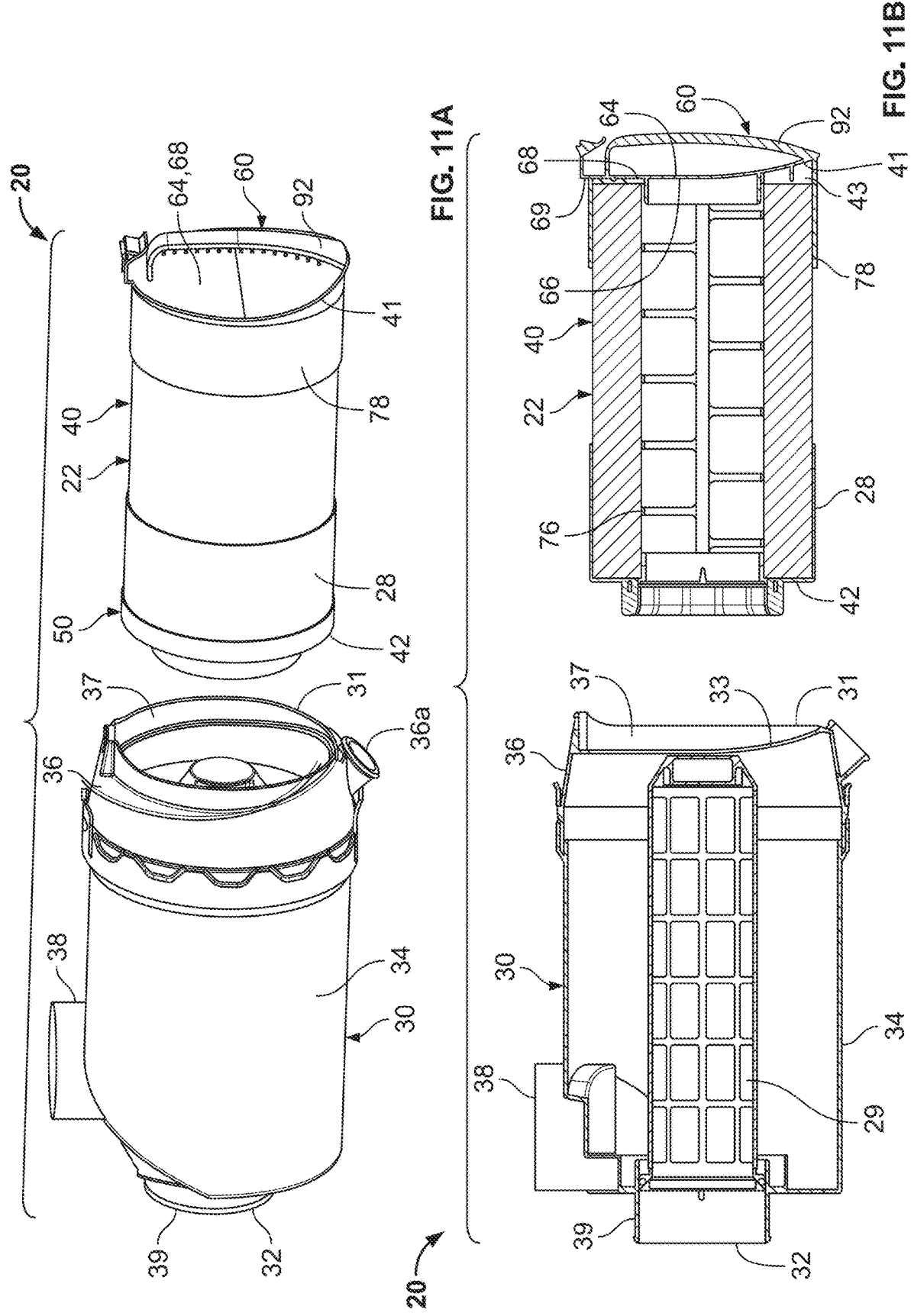

FILTER ELEMENT WITH CLOSED ENDCAP FORMING A SEAL POSITIONED AT DIFFERENT AXIAL DISTANCES

CROSS-REFERENCE TO RELATED PATENT APPLICATIONS

This application is a National Phase based on PCT Application No. PCT/US2021/026608, filed Apr. 9, 2021, which claims priority to and the benefit of U.S. Provisional Patent Application No. 63/009,824, filed Apr. 14, 2020. The contents of these applications are incorporated herein by reference in their entireties.

FIELD

The present application relates generally to air cleaner assemblies with a filter element comprising a closed endcap.

BACKGROUND

Various conventional air cleaner assemblies have a housing and a filter element that is entirely contained within the housing (which may include both a body and a cover). Accordingly, to service the filter element, the cover must be removed from the body of the housing to access the filter element. Furthermore, closed endcaps of various conventional filter elements have a planar surface that is normal to the central axis of the filter element. This arrangement does not provide a great deal of flexibility with regard to how the space within the air cleaner assembly can be utilized.

SUMMARY

Various embodiments provide for an air cleaner assembly that comprises a housing and a filter element. The housing comprises a first housing end and a second housing end. The second housing end of the housing defines an opening of the housing for fluid flow. The filter element is configured to be received through the first housing end of the housing. The filter element comprises a filter media and a closed endplate. The filter media comprises a first media end and a second media end. The second media end of the filter media defines an opening of the filter element for fluid flow. The closed endplate is positioned along the first media end of the filter media and comprises a wall with an axially inner surface and an axially outer surface. The axially outer surface is exposed to an area outside of the housing and closes off the first housing end of the housing when the filter element is positioned within the housing. The closed endplate comprises a closed endplate sealing surface that forms a seal with a cover of the housing. The closed endplate sealing surface is not at a constant axial distance from the second media end of the filter media.

Various other embodiments provide for a filter element positionable within a housing. The filter element comprises a filter media and a closed endplate. The filter media comprises a first media end and a second media end. The second media end of the filter media defines an opening of the filter element for fluid flow. The closed endplate is positioned along the first media end of the filter media and comprises a wall with an axially inner surface and an axially outer surface. The axially outer surface is exposed to an area outside of the housing and closes off a first housing end of the housing when the filter element is positioned within the housing. The closed endplate comprises a closed endplate sealing surface that forms a seal with a cover of the housing. The closed endplate sealing surface is not at a constant axial distance from the second media end of the filter media.

Still other embodiments provide for a filter element positionable within a housing. The filter element comprises a filter media and a closed endplate. The filter media comprises a first media end and a second media end. The second media end of the filter media defines an opening of the filter element for fluid flow. The closed endplate is positioned along the first media end of the filter media. The closed endplate comprises a wall with an axially inner surface and an axially outer surface. The axially outer surface is exposed to an area outside of the housing and closes off a first housing end of the housing when the filter element is positioned within the housing. The closed endplate comprises at least one radial slot configured to mate with a corresponding protruding rib of the housing.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2A is a perspective view of a cover of a housing of the air cleaner assembly of FIG. 1A.

FIG. 2B is a cross-sectional view of the cover of FIG. 2A.

FIG. 3B is a side view of the filter element of FIG. 3A.

FIG. 3C is a cross-sectional view of the filter element of FIG. 3A.

FIG. 4C is another side view of the closed endplate of FIG. 4A.

FIG. 4D is a side view of the closed endplate of FIG. 4A, approximately 90° from the view of FIG. 4C.

FIG. 6 is a cross-sectional, schematic view of a filter element according to one embodiment.

FIG. 7 is a cross-sectional, schematic view of a filter element according to still another embodiment.

FIG. 8 is a cross-sectional, schematic view of an air cleaner assembly according to yet another embodiment.

FIG. 10A is a perspective view of a portion of the filter element of the air cleaner assembly of FIG. 1A.

FIG. 10B is a perspective view of a portion of the cover of the housing of the air cleaner assembly of FIG. 1A.

FIG. 10C is a perspective view of a portion of the filter element attached to the cover of the housing of the air cleaner assembly of FIG. 1A.

FIG. 11A is a perspective view of an air cleaner assembly according to another embodiment, showing the filter element separated from the filter housing.

FIG. 11B is a cross-sectional view of the air cleaner assembly of FIG. 11A.

DETAILED DESCRIPTION

Referring to the figures generally, various embodiments disclosed herein relate to an air cleaner assembly with a housing and an air filter element. The filter element comprises a filter media and a closed endplate that forms a seal that is positioned at different axial distances relative to an end of the filter media and is exposed to an area outside of the housing when the filter element is assembled within the housing.

Air Cleaner Assembly

FIGS. 1A-1E show an example air cleaner assembly 20 that comprises a filter element 22 and a filter housing 30. The air cleaner assembly 20 is configured to filter a fluid. Although air is referred to herein, it is understood that the air cleaner assembly 20 may be used with other fluids, such as a liquid. As described further herein, the filter element 22 is positionable within the housing 30. The air cleaner assembly 20 may be a cylindrical and/or an axial-load style air cleaner assembly.

Filter Housing

Figure 1A:
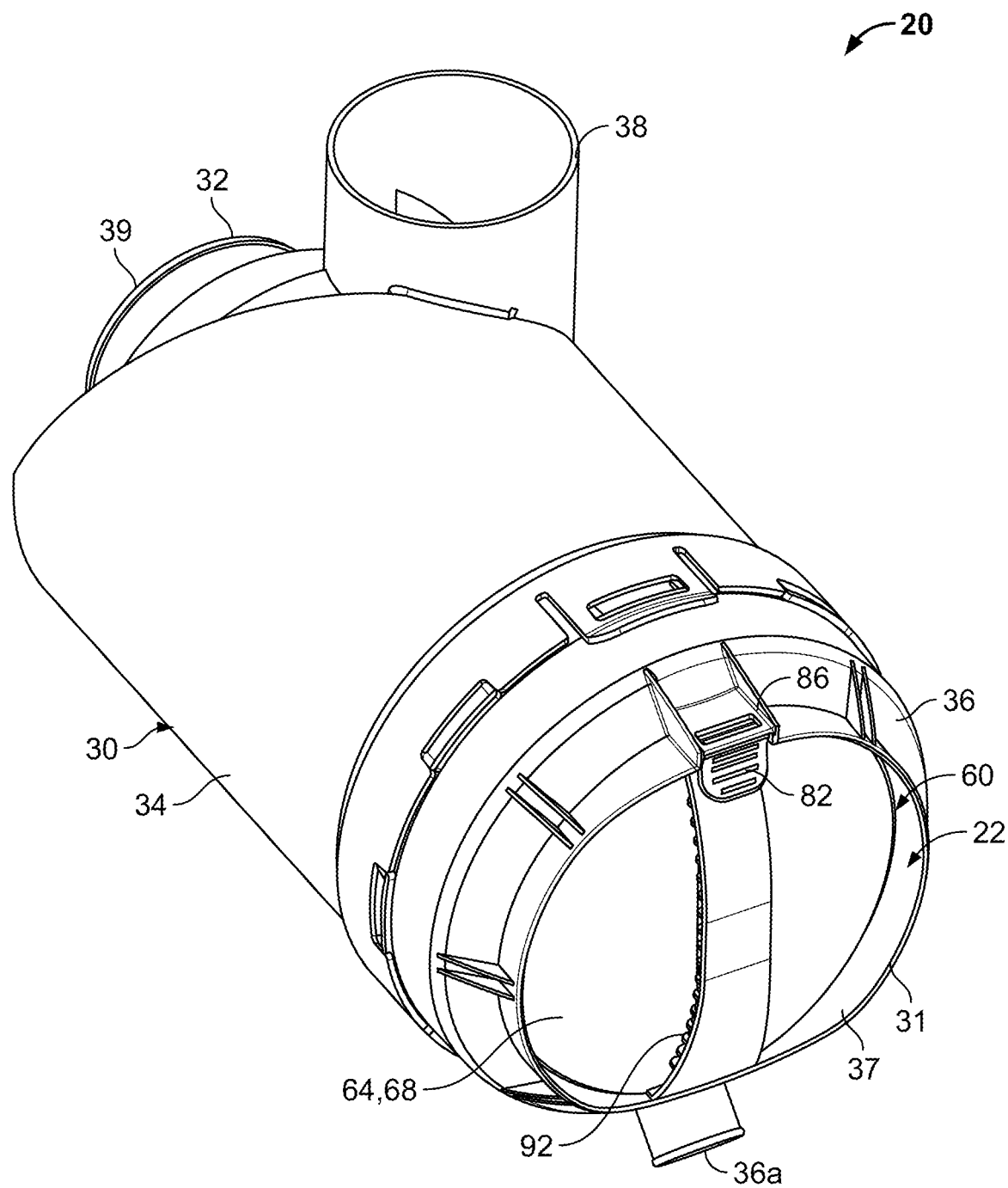
FIG. 1A is a perspective view of an air cleaner assembly according to one embodiment.
Figure 1B:
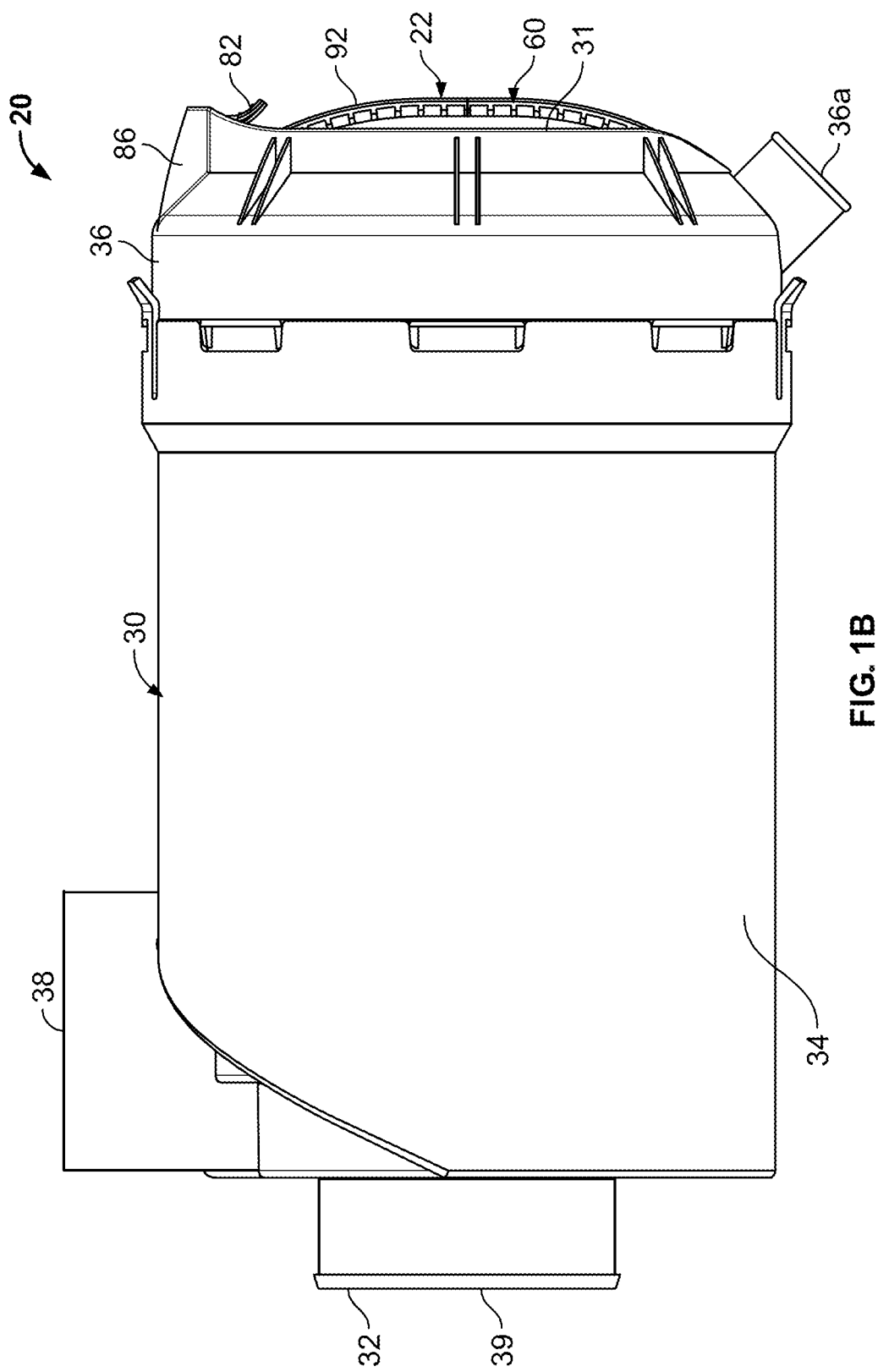
FIG. 1B is a side view of the air cleaner assembly of FIG. 1A.
Figure 1C:
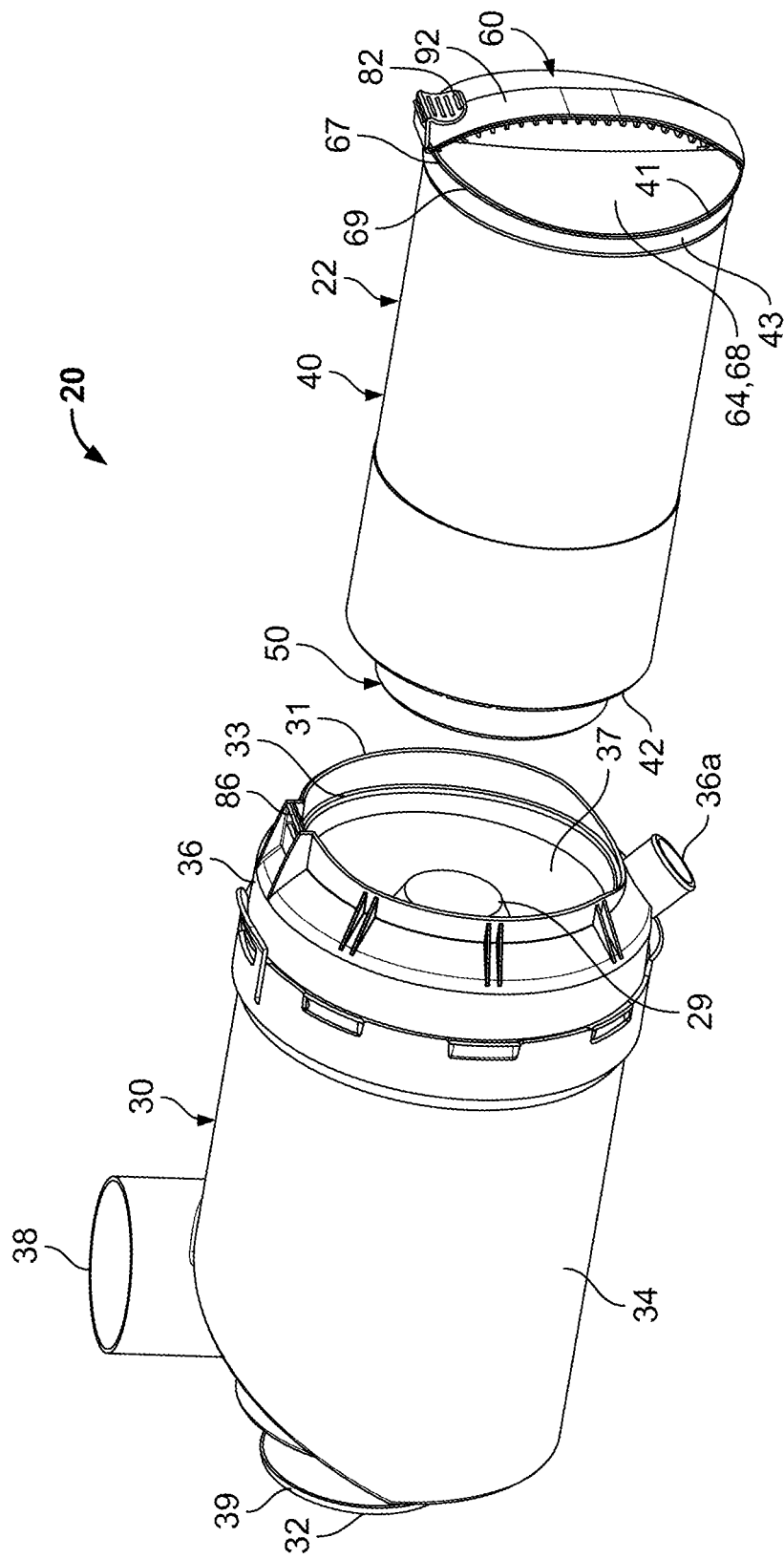
FIG. 1C is a perspective view of the air cleaner assembly of FIG. 1A showing the filter element separated from the filter housing.

As shown in FIGS. 1A-1C, the housing 30 (which may be referred to as the air filter housing assembly) comprises an inlet 38 to allow unfiltered fluid to flow into the housing 30 and into the filter element 22 and an outlet 39 to allow filtered fluid to flow out from the housing 30 after flowing through and being filtered by the filter element 22. Although the inlet 38 is shown on the radial side of the housing 30 and the outlet 39 is shown on an axial end of the housing 30, it is understood that the fluid flow direction may be reversed, and thus the inlet 38 and the outlet 39 may be switched. The housing 30 may be an axial-load style air filter housing.

Figure 1D:
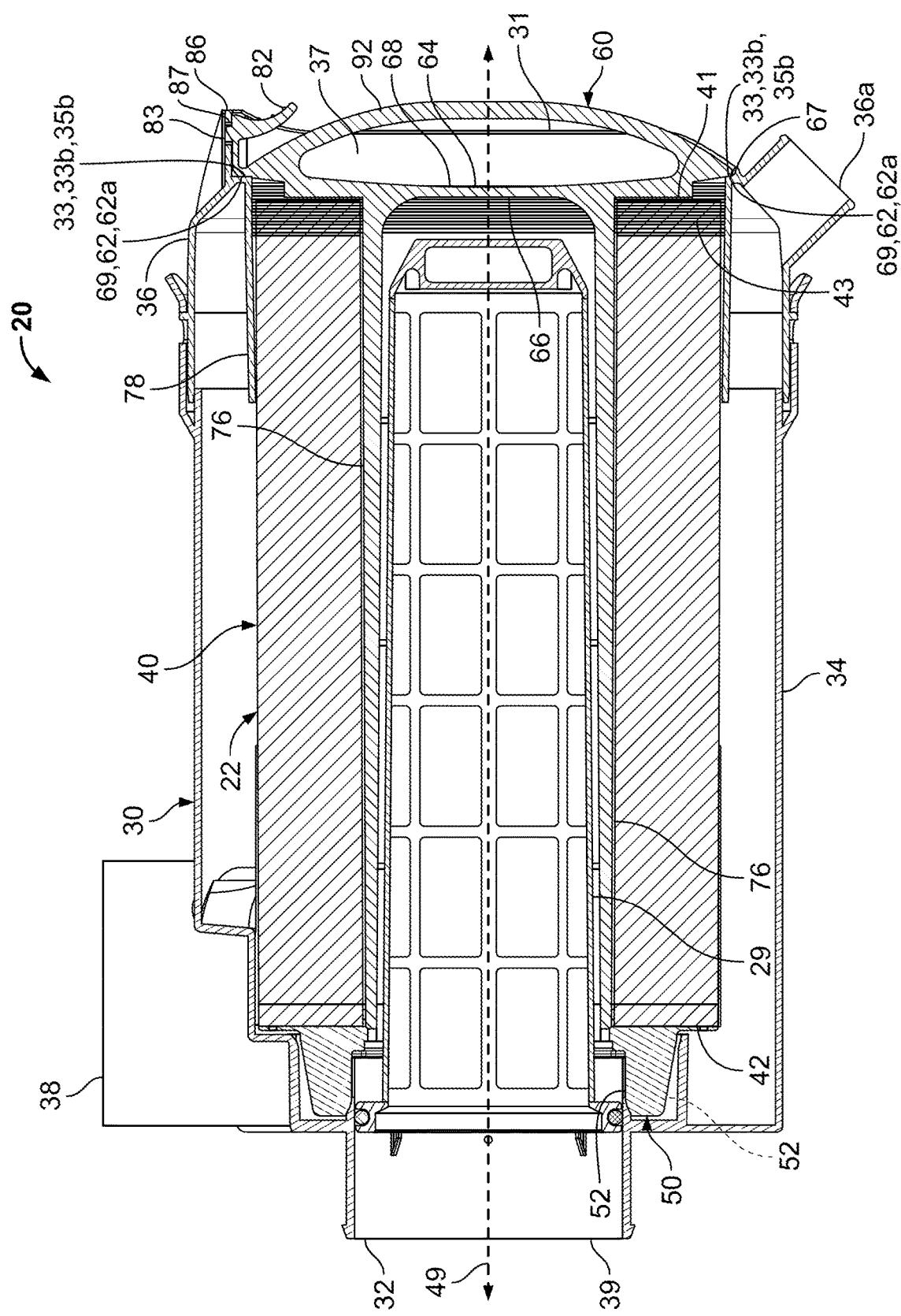
FIG. 1D is a cross-sectional view of the air cleaner assembly of FIG. 1A.
Figure 1E:
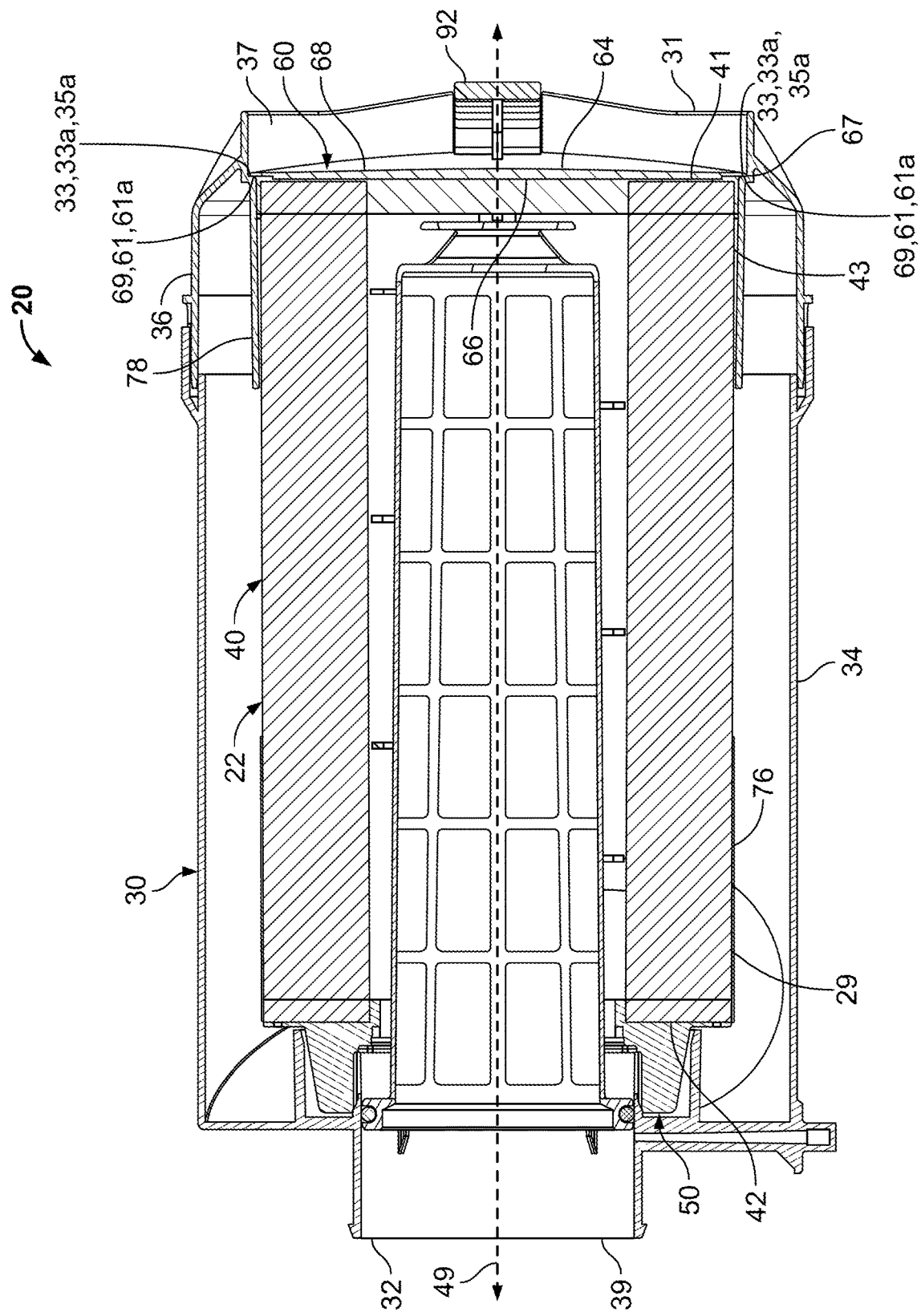
FIG. 1E is a cross-sectional view of the air cleaner assembly of FIG. 1A, approximately 90° from the cross-sectional view of FIG. 1D.

The housing 30 comprises a first axial end (referred to as the first housing end 31) and a second axial end (referred to as the second housing end 32) on opposite axial ends of the housing 30. The first housing end 31 is configured to receive the filter element 22, as shown in FIG. 1C and described further herein. The second housing end 32 defines an opening (e.g., an annular opening) of the housing 30, as shown in FIGS. 1D-1E, through which fluid can flow into or out from the filter element 22. According to one embodiment, the outlet 39 is positioned along the second housing end 32.

The housing 30 further comprises a body 34 and a cover 36 that are attachable, detachable, and reattachable to each other. The cover 36 is positioned along and defines the first housing end 31 of the housing 30. The body 34 is positioned along and defines the second housing end 32 of the housing 30. As shown in FIG. 1D, the body 34 and the cover 36 are each configured to extend axially along and around different axial portions (and axial ends) of the filter element 22. The inlet 38 may extend through a sidewall of the body 34, while the outlet 39 may extend through the axial end (corresponding to the second housing end 32) of the body 34.

As shown in FIGS. 1D-2B, the cover 36 defines an axial through-hole 37 such that the cover 36 is open along both axial ends thereof. The through-hole 37 of the cover 36 is sized such that filter element 22 can fit completely within and extend through the through-hole 37 (as shown in FIGS. 1D-1E). Accordingly, the filter element 22 can extend completely through and within the cover 36 (i.e., within the through-hole 37). In particular, an axial end of the filter element 22 (corresponding to the first media end 41 of the filter media 40) extends and is exposed through one axial end of the cover 36 (that corresponds to the first housing end 31 of the housing 30), while a portion of the axial length of the filter element 22 extends through the other axial end of the cover 36 (that is closer to the second housing end 32 of the housing 30). The filter element 22 can be inserted into or removed from the housing 30 through the through-hole 37, without separating the cover 36 and the body 34 from each other. Accordingly, the filter element 22 can be partially or completely removed from the housing 30 (to, for example, service the filter element 22), without removing the cover 36 from the body 34, thereby eliminating a step in the servicing process. Furthermore, as described further herein, the closed endplate 60 of the filter element 22 is exposed to an area outside of the housing 30 through the through-hole 37 (when the filter element 22 is completely installed or positioned within the housing 30).

As shown in FIGS. 1C-2B, the cover 36 comprises a housing cover sealing surface 33 (along a surface of the cover 36 that extends axially and/or radially and that faces outwardly, away from an interior of the housing 30) that is configured to engage with a surface of the closed endplate, for example by forming a seal with the closed endplate 60 (in particular with a closed endplate sealing surface 69 of the closed endplate 60), as described further herein. The housing cover sealing surface 33 is positioned and extends around the inner perimeter of the through-hole 37 of the cover 36. The shape, size, and configuration of the housing cover sealing surface 33 is complementary to the closed endplate sealing surface 69 of the closed endplate 60.

According to one embodiment, the housing cover sealing surface 33 comprises a step, protrusion, or ledge that extends around the entire inner perimeter of the through-hole 37 of the cover 36. In particular, the inner diameter of the through-hole 37 along the end of the cover 36 that corresponds to the first housing end 31 of the housing 30 is larger than the inner diameter of the through-hole 37 along an opposite axial end of the cover 36, where the ledge of the housing cover sealing surface 33 transitions the cover 36 between the larger and smaller inner diameters. The shape of the housing cover sealing surface 33 is complementary to the shape of the closed endplate sealing surface 69. For example, different portions of the housing cover sealing surface 33 are different axial distances from each of the first housing end 31 and the second housing end 32 of the housing 30 and from the second media end 42 of the filter media 40 and are positioned at different axial positions along the central axis 49 about the inner circumference of the cover 36.

According to one embodiment as shown in FIG. 1D compared to FIG. 1E (as well as FIG. 2B), the housing cover sealing surface 33 is curved or arced about the inner perimeter of the through-hole 37 or have at least one angled or curved portion that is not normal to the central axis 49. The housing cover sealing surface 33 comprises at least one first housing sealing zone, section, region, or portion 33a and at least one second housing sealing zone, section, region, or portion 33b. According to some embodiments (as described further herein), the housing cover sealing surface 33 comprises two first housing portions 33a and two second housing portions 33b. The second housing portions 33b of the housing cover sealing surface 33 are axially further from the second housing end 32 of the housing 30 and from the second media end 42 of the filter media 40 (as shown in FIG. 1D) and axially closer to the first housing end 31 of the housing 30. Comparatively, as shown in FIG. 1E, the first housing portions 33a of the housing cover sealing surface 33 are axially closer to the second housing end 32 of the housing 30 and the second media end 42 of the filter media 40 and axially further from the first housing end 31 of the housing 30. However, it is understood that the housing cover sealing surface 33 may have a variety of different configurations (e.g., at least a portion of the housing cover sealing surface 33 may be planar and not normal to the central axis 49 or non-planar relative to a plane that is normal to the central axis 49 by being curved, arced, and/or angled) to complement the shape and configuration of the closed endplate sealing surface 69.

To include at least the first housing portion 33a and the second housing portion 33b, in various embodiments the housing cover sealing surface 33 comprises a continuous, gradual curve that extends between at least one elevated location (i.e., the at least one second housing portion 33b) and at least one lower location (i.e., the at least one first housing portion 33a). Accordingly, the second housing portion 33b and the first housing portion 33a are a part of the same continuous surface, rather than separate, different surfaces. With multiple second housing portions 33b and multiple first housing portions 33a, the housing cover sealing surface 33 curves multiple different times between the second housing portions 33b and the first housing portions 33a. However, according to various embodiments, the housing cover sealing surface 33 may include angled portion(s) that extend continuously between the second housing portion(s) 33b and the first housing portion(s) 33a, which corresponds to the configurations of the various closed endplate sealing surfaces 69 shown in FIGS. 6-8.

Each first housing portion 33a includes a first housing part or point 35a, which corresponds to a minimum axial height of the housing cover sealing surface 33 along the central axis 49. Each second housing portion 33b includes a second housing part or point 35b, which corresponds to a maximum axial height of the housing cover sealing surface 33 along the central axis 49. For example, if the housing cover sealing surface 33 gradually extends between the first housing portion 33a and the second housing portion 33b in a curved manner (as shown in FIGS. 1D-1E) or the first housing portion 33a and/or the second housing portion 33b are an angled planar surface (to correspond with the filter element 22 shown in FIG. 6), the first housing point 35a and/or the second housing point 35b correspond to only a part of the first housing portion 33a and the second housing portion 33b, respectively.

According to some embodiments (as shown, for example in FIGS. 1D-2B), the housing cover sealing surface 33 comprises two first housing portions 33a and two corresponding first housing points 35a (that are opposite each other about the central axis 49 and approximately 180° from each other) and two second housing portions 33b and two corresponding second housing points 35b (that are opposite each other about the central axis 49 and approximately 180° from each other). FIGS. 1D and 1E show the relative positioning of each of the two second housing portions 33b (and the corresponding two second housing points 35b) and each of the two first housing portions 33a (and the corresponding two first housing points 35a), respectively. Accordingly, each of the two first housing points 35a are approximately 90° apart from the two second housing points 35b (and vice versa) about the inner circumference of the housing 30.

As shown in FIG. 2B, to define the two first housing portions 33a and the two second housing portions 33b, the housing cover sealing surface 33 includes middle portions that curve downwardly (toward the second housing end 32 of the housing 30, as shown in FIG. 1D) from two opposite radial ends (corresponding to the two second housing points 35b). Each of the two opposite radial ends (corresponding to the two first endplate points 35a) curve upwardly (away from the second housing end 32 of the housing 30 and the filter media 40, as shown in FIG. 1E) from the middle portion. Accordingly, the curved middle portions of the housing cover sealing surface 33 define the two first housing portions 33a, and the two opposite radial ends of the wall 64 define the two second housing portions 33b. The first housing portions 33a may be referred to as a first pair of opposite radial sides or ends, and the second housing portions 33b may be referred to as a second pair of opposite radial sides or ends.

The cover 36 may also comprise other components, such as a dust evacuator valve (DEV) port 36a. An aspiration tube and/or a DEV valve may be connected to the DEV port 36a. According to one embodiment, the cover 36 may be constructed from or otherwise comprise plastic.

As shown in FIGS. 1C-1E, the housing 30 further includes an inner support 29 that is configured to be positioned within the filter element 22 (e.g., within the centertube 76 of the filter element 22). The inner support 29 may be attached to an inner surface of the outlet 39 and extend axially within (and along the axial length of) the body 34 of the housing 30.

Filter Element

The filter element 22 (which may be referred to as a primary air filter cartridge) is positionable within the housing 30 and is configured to be received through the first housing end 31 of the housing 30 (in particular through the through-hole 37 of the cover 36), as shown in FIGS. 1C-1E. The filter element 22 may be an axial-load style air filter element.

Figure 3A:
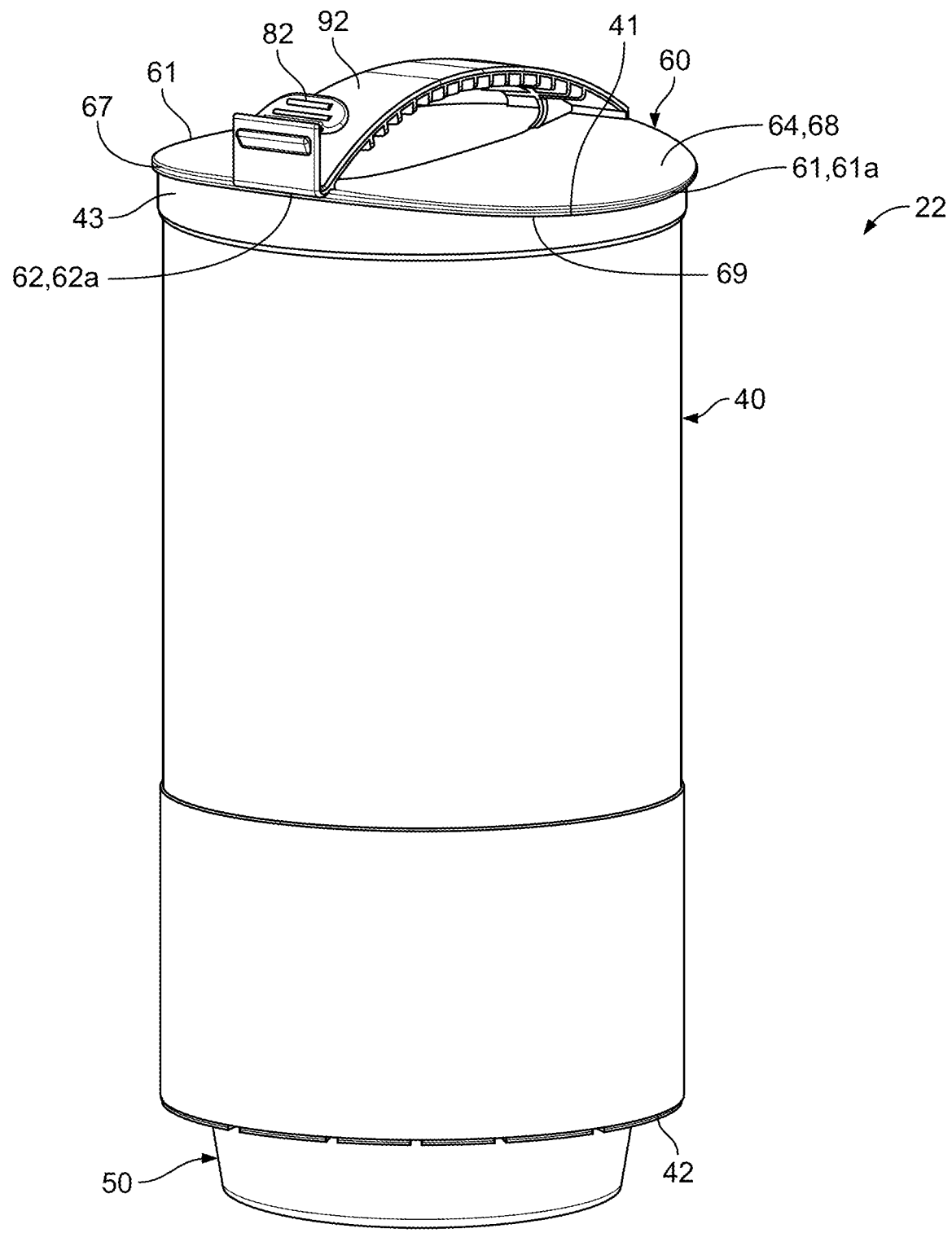
FIG. 3A is a perspective view of a filter element of the air cleaner assembly of FIG. 1A.
Figure 3E:
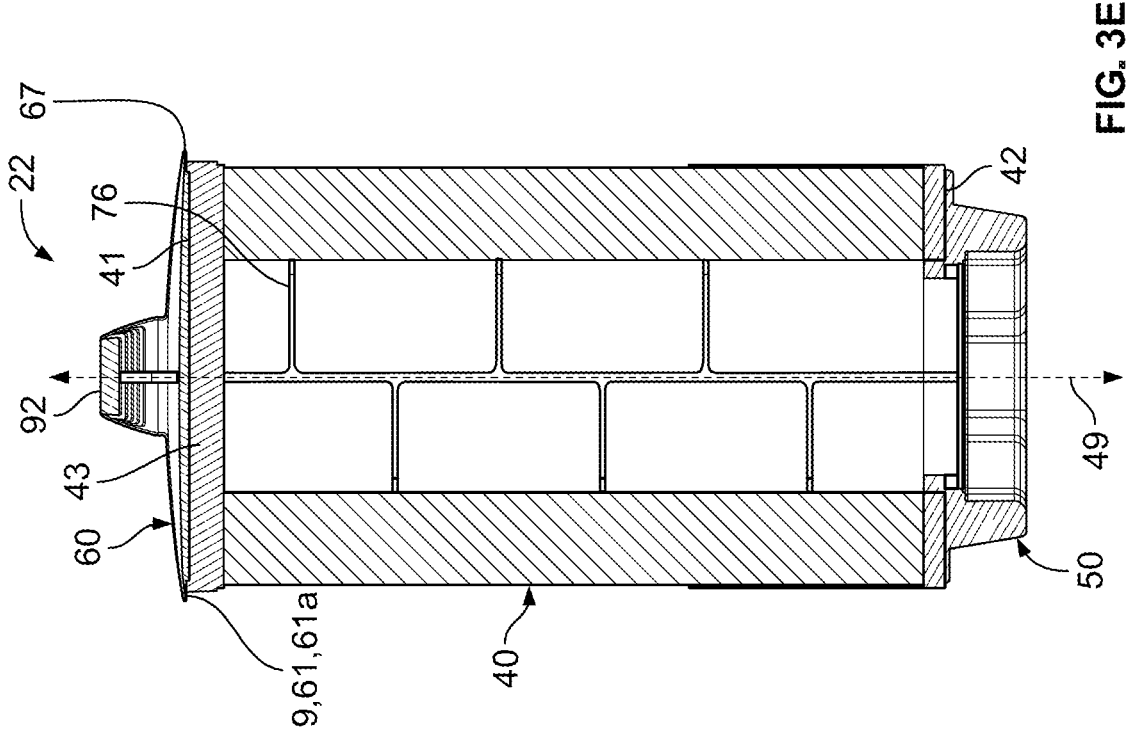
FIG. 3E is a cross-sectional view of the filter element of FIG. 3A, approximately 90° from the view of FIG. 3C.

As shown in FIGS. 3A-3E, the filter element 22 comprises a filter media 40, an open endplate 50, and a closed endplate 60. As shown in FIGS. 3C and 3E, the filter element 22 further comprises a centertube 76, which may be a part of the closed endplate 60. The filter media 40 is configured to filter a fluid (such as air) and comprises a first axial end (referred to as the first media end 41) and a second axial end (referred to as the second media end 42) that are on opposite axial ends of the filter media 40 from each other. As shown in FIGS. 1D-1E, when the filter element 22 is installed within the housing 30, the first media end 41 of the filter media 40 is closer to the first housing end 31 of the housing 30, and the second media end 42 of the filter media 40 is closer to the second housing end 32 of the housing 30. Accordingly, the second media end 42 of the filter media 40 (along the second endplate 50) defines an opening of the filter element 22 through which fluid can flow (either into or out from the filter element 22, depending on the desired configuration). The opening along the second media end 42 of the filter media 40 may be an annular opening.

The open endplate 50 (which may be referred to as an open endcap) is positioned along the second media end 42 of the filter media 40 and also defines an opening (such as an annular opening) through which fluid can flow (either into or out from the filter element 22, depending on the desired configuration). The opening of the open endplate 50 is concentric with the opening of the filter media 40 to allow for fluid flow through the second media end 42. For example, as shown in FIG. 1D, the second media end 42 of the filter media 40 and the opening of the open endplate 50 are aligned with and fluidly connected to the outlet 39 along the second housing end 32 of the housing 30 and therefore together provide an area for filtered fluid to exit from within the filter element 22. The respective openings of the open endplate 50 and the second media end 42 of the filter media 40 may also be configured to receive the inner support 29.

Closed Endplate

As shown in FIGS. 3C and 3E, the closed endplate 60 (which may be referred to as a closed endcap) is positioned along and completely covers and fluidly closes the first media end 41 of the filter media 40 such that fluid cannot flow through the first media end 41 of the filter media 40. As shown in FIGS. 1D-1E, due to the through-hole 37 of the cover 36 of the housing 30, the closed endplate 60 is exposed to the outside of the housing 30 through the through-hole 37 of the cover 36. In particular, a majority (or all) of a first axial end (i.e., the axially outer surface 68) of the closed endplate 60 is completely exposed and visible to the outside of the housing 30 through the through-hole 37 of the cover 36 when the filter element 22 is installed within the housing 30. When installed, although the cover 36 may extend axially beyond the first axial end of the closed endplate 60, the first axial end (i.e., the axially outer surface 68) of the closed endplate 60 is not radially or axially covered or obscured at all by any portion of the housing 30 (as shown in FIG. 1A). The rest of the closed endplate 60 (which includes a second axial end and the axially inner surface 66 of the closed endplate 60) faces the opposite or different directions from the axially outer surface 68 and is not exposed to the outside of the housing 30 through the through-hole 37 of the cover 36 when the filter element 22 is installed within the housing 30.

According to one embodiment, the closed endplate 60 may be removably and reattachably attachable to the filter media 40 to allow the closed endplate 60 to be reused within multiple filter elements 22 (and thus with multiple different filter medias 40). Accordingly, the closed endplate 60 may be removed from the filter media 40 (once the filter media 40 has been sufficiently used and needs to be replaced, for example) and reattached to a new or different filter media 40.

As described further herein, the filter element 22 and the cover 36 are configured to form a seal therebetween (which may be a radial/radially directed and/or axial/axially directed seal) to prevent any fluid leakage. The location of the formed seal is between the exposed first axial end (i.e., the axially outer surface 68) and the non-exposed second axial end (i.e., the axially inner surface 66) of the wall 64 of the closed endplate 60 (or along the axially inner surface 66 of the wall 64), thereby preventing any fluid from flowing between the first axial end and the second axial end of the wall 64 of the closed endplate 60 and from flowing between the wall 64 and the cover 36. Along the closed endplate 60, the seal is formed along a surface of the closed endplate 60 that extends axially and/or radially and is between or along the first axial end and the second axial end of the wall 64 of the closed endplate 60. Along the cover 36, the seal is formed along a surface of the cover 36 that extends axially and/or radially and is within the through-hole 37 axially between the first housing end 31 and the opposite axial end of the cover 36.

The closed endplate 60 comprises a base or main radially-extending wall 64 that extends radially over and beyond the first media end 41 of the filter media 40. As shown in FIGS. 3B-3E, the outer edge of the wall 64 extends radially beyond the outer surface of the filter media 40 in order to provide an area or lip (i.e., a closed endplate sealing surface 69) to axially and/or radially seal or otherwise engage with the housing cover sealing surface 33 of the housing 30. When the filter element 22 is installed within the cover 36, the wall 64 extends along and abuts the inner circumference of the cover 36 (and the cover 36 extends along and abuts the outer circumference of the wall 64) (as shown in FIG. 1A).

The wall 64 of the closed endplate 60 comprises an axially inner surface 66 and an axially outer surface 68 that are opposite each other. The radially outer surface or perimeter 67 of the wall 64 extends axially between the axially inner surface 66 and the axially outer surface 68 of the wall 64. The axially inner surface 66 faces inwardly, axially toward the filter media 40 and may extend along and abut the first media end 41 of the filter media 40. The axially outer surface 68 faces outwardly, axially away from the filter media 40, in an opposite direction from the axially inner surface 66. The outer perimeter 67 faces radially outward toward the cover 36. Therefore, when the filter element 22 is installed or positioned within the housing 30, the axially outer surface 68 is exposed to the area outside of the housing 30 (through the through-hole 37 of the cover 36), and the wall 64 of the closed endplate 60 (in particular the axially outer surface 68) fluidly and radially closes off the first housing end 31 of the housing 30, thereby acting as an axial end of the housing 30. In one embodiment, the wall 64 may extend completely outside of the housing 30. The closed endplate sealing surface 69 may be positioned along the outermost edge of the wall 64, along the radially-extending, outer edge of the axially inner surface 66 and/or along the axially-extending, outer perimeter 67 of the wall 64.

Because the filter element 22 (in particular the closed endplate 60) is exposed to an area outside of the housing 30 through the cover 36 and the axially outer surface 68 of the wall 64 of the closed endplate 60 is not covered by any portion of the housing 30 (when the filter element 22 is completely installed or positioned within the housing 30) and due to the relative sizing between the filter element 22 and the through-hole 37 of the cover 36, the filter element 22 can be easily accessed and removed from or inserted into the housing 30 (and therefore serviced) without disassembling the housing 30 (e.g., without removing the cover 36 from the body 34), as shown in FIG. 1C. In particular, the outermost perimeter of the filter element 22 is smaller than the inner perimeter of the through-hole 37 of the cover 36 such that the filter element 22 can be inserted into and out from the housing 30 through the through-hole 37. Therefore, the configuration of the air cleaner assembly 20 reduces the amount of time, steps, and effort needed to service the filter element 22. For example, the outermost perimeter of the filter element 22 along the entire axial length of the filter element 22, aside from along the outer perimeter 67 along the wall 64, is smaller than the innermost perimeter along the entire axial length of the through-hole 37 along the entire axial length of the cover 36 such that the filter element 22 can be inserted into and through the cover 36. The outer perimeter 67 of the wall 64 is smaller than the innermost perimeter of the through-hole 37 between the first housing end 31 and the housing cover sealing surface 33 and is larger than the innermost perimeter of the through-hole 37 at the housing cover sealing surface 33 (and optionally also the innermost perimeter of the through-hole 37 between the housing cover sealing surface 33 and the axial end of the cover 36 that is opposite the first housing end 31) to allow the filter element 22 and the cover 36 to form a seal therebetween (as shown in FIGS. 1D-1E).

Because the closed endplate 60 of the filter element 22 is exposed to the area outside of the housing 30 (and therefore to conditions and air outside of the housing 30), the filter element 22 and the cover 36 are configured to form a seal together to prevent any fluid leakage. In particular, as shown in FIGS. 1C-3E, the closed endplate 60 comprises a closed endplate sealing surface 69 (along a surface of the closed endplate 60 that extends axially and/or radially) that is configured to form a seal with the housing cover sealing surface 33 of the cover 36 of the housing 30. The seal refers to the area or zone where the closed endplate 60 sealably contacts the cover 36 by, for example, compressing the closed endplate sealing surface 69 against an edge (i.e., the housing cover sealing surface 33) of the cover 36. The resulting seal prevents fluid leakage (such as water or unwanted air) from entering into or flowing out from within the housing 30 at the interface between the filter element 22 (in particular the closed endplate 60) and the cover 36. As shown in FIG. 1D, the seal may be positioned along or near the first housing end 31 of the housing 30 and the first axial end of the filter element 22 (i.e., axially between the axial ends of the cover 36 and axially along the wall 64 of the closed endplate 60 (i.e., along the axially inner surface 66 and/or along the outer perimeter 67 of the wall 64 of the closed endplate 60)).

The resulting seal formed between the closed endplate sealing surface 69 and the housing cover sealing surface 33 by the closed endplate 60 with the cover 36 of the housing 30 may be an axial/axially-directed seal (where the closed endplate sealing surface 69 is an axial sealing surface of the closed endplate 60 along the outer edge of the axially inner surface 66) and/or a radial/radially-directed seal (where the closed endplate sealing surface 69 is a radial sealing perimeter of the closed endplate 60 along the outer perimeter 67). According to one embodiment, the closed endplate sealing surface 69 may be positioned at a slight angle to the central axis 49 of the filter media 40 to allow the filter element 22 to be demolded. Accordingly, most of the resulting sealing force is radial, with a relatively small axial component. Alternatively, the resulting sealing force may be entirely axial.

The closed endplate sealing surface 69 may be positioned and extend along the outer edge of the axially inner surface 66 and/or around the outer perimeter 67 of the wall 64. As shown in FIGS. 3B-3E, the closed endplate sealing surface 69 (and optionally also the axially outer surface 68 and/or the outer perimeter 67 of the wall 64) is not at a constant axial distance (and instead is positioned at and extends along different axial distances or positions along the central axis 49 about the outer circumference of the wall 64) from the second media end 42 of the filter media 40 about the outer perimeter of the filter element 22. Accordingly, the resulting seal formed between the closed endplate sealing surface 69 and the housing cover sealing surface 33 is also not at a constant axial distance from the second housing end 32 of the housing 30 (and from the second media end 42 of the filter media 40) and extends along at different axial positions along the central axis 49 about the outer circumference of the wall 64 and the inner circumference of the cover 36.

According to one embodiment as shown in FIG. 1D compared to FIG. 1E, the portions of the seal between the closed endplate sealing surface 69 and the housing cover sealing surface 33 that are radially aligned with the ends of the handle 92 (and therefore aligned with the latch 82 (and the receiver 86) and the DEV port 36a) are axially further from the second media end 42 of the filter media 40 and the second housing end 32 of the housing 30 than the portions of the seal that are radially halfway between the ends of the handle 92 (and therefore aligned with the latch 82 (and the receiver 86) and the DEV port 36a). Further, the closed endplate sealing surface 69 of the closed endplate 60 does not have a circular shape about the perimeter of the closed endplate 60. Instead, the closed endplate sealing surface 69 is at least partially angled or curved relative to a radial plane (that extends substantially perpendicularly to the central axis 49).

To create the above sealing configuration, different portions of the closed endplate sealing surface 69 are different axial distances from the second media end 42 of the filter media 40. Accordingly, at least a portion of the wall 64 (which includes the axially outer surface 68, the axially inner surface 66, and/or the outer perimeter 67) either is planar and not normal to a central axis 49 of the filter media 40 (as shown in FIG. 6) or is non-planar relative to a plane that is normal to the central axis 49 of the filter media 40 (as shown in FIGS. 1D-1E, 3A-3E, and 7-8). The shape and configuration of the closed endplate sealing surface 69 complements the shape and configuration of the housing cover sealing surface 33. The configuration and shape of the closed endplate sealing surface 69 is defined by the configuration and shape of the wall 64 (in particular by the axially outer surface 68, the axially inner surface 66, and/or the outer perimeter 67). For the axially outer surface 68 or the axially inner surface 66 that is planar, the wall 64 (including the axially outer surface 68 and/or the axially inner surface 66 and therefore the closed endplate sealing surface 69) is planar and positioned at an oblique angle relative to the central axis 49 of the filter media 40 (as shown in FIG. 6).

For the axially outer surface 68 or the axially inner surface 66 that is non-planar, the axially outer surface 68 or the axially inner surface 66 (and therefore the closed endplate sealing surface 69) may be curved or arced or have at least one angled or curved portion that is not normal to the central axis 49 of the filter media 40 (as shown in FIGS. 1D-1E, 3A-3E, and 7-8). According to one embodiment as shown in FIGS. 3B-3C compared to FIGS. 3D-3E (as well as FIG. 3A), the wall 64 (and therefore the closed endplate sealing surface 69) is curved or arced about the outer perimeter of the filter element 22. The closed endplate sealing surface 69 comprises at least one first endplate sealing zone, section, region, or portion 61 and at least one second endplate sealing zone, section, region, or portion 62. According to some embodiments (as described further herein), the closed endplate sealing surface 69 (and the wall 64) comprises two first endplate portions 61 and two second endplate portions 62.

The second endplate portions 62 of the wall 64 (and the closed endplate sealing surface 69) are axially further from the second housing end 32 of the housing 30 and from the second media end 42 of the filter media 40 (as shown in FIG. 1D) and axially closer to the first housing end 31 of the housing 30. Comparatively, as shown in FIG. 1E, the first endplate portions 61 of the wall 64 (and the closed endplate sealing surface 69) are axially closer to the second housing end 32 of the housing 30 and the second media end 42 of the filter media 40 and axially further from the first housing end 31 of the housing 30.

To include at least the first endplate portion 61 and the second endplate portion 62, the closed endplate sealing surface 69 is a continuous, gradual curve the extends between at least one elevated location (i.e., the at least one second endplate portion 62) and at least one lower location (i.e., the at least one first endplate portion 61). Accordingly, the second endplate portion 62 and the first endplate portion 61 are a part of the same continuous surface, rather than separate, different surfaces. With multiple second endplate portions 62 and multiple first endplate portions 61, the closed endplate sealing surface 69 curves multiple different times between the second endplate portions 62 and the first endplate portions 61. However, according to various embodiments, the closed endplate sealing surface 69 may include angled portion(s) that extend continuously between the second endplate portion(s) 62 and the first endplate portion(s) 61, as shown in FIGS. 6-8 and described further herein. The continuous curves or angles of the closed endplate sealing surface 69 and the housing cover sealing surface 33 are complementary to each other to form a seal therebetween about their entire perimeters, as described further herein.

The first endplate portion 61 includes a first endplate part or point 61*a*, which corresponds to a minimum axial height of the closed endplate sealing surface 69 along the central axis 49. The second endplate portion 62 includes a second endplate part or point 62*a*, which corresponds to a maximum axial height of the closed endplate sealing surface 69 along the central axis 49. For example, if the closed endplate sealing surface 69 gradually extends between the first endplate portion 61 and the second endplate portion 62 in a curved manner (as shown in FIGS. 1D-1E) or the first endplate portion 61 and/or the second endplate portion 62 are an angled planar surface (as shown in FIG. 6), the first endplate point 61*a* and/or the second endplate point 62*a* correspond to only a part of the first endplate portion 61 and the second endplate portion 62, respectively.

According to various embodiments, the closed endplate sealing surface 69 may have a variety of different configurations (e.g., at least a portion of the closed endplate sealing surface 69 may be planar and not normal to the central axis 49 or non-planar relative to a plane that is normal to the central axis 49 by being curved, arced, and/or angled) to complement the shape and configuration of the housing cover sealing surface 33. According to various embodiments, the second endplate points 62*a* are radially aligned with the ends of the handle 92 and the latch 82, and the first endplate points 61*a* are radially halfway between the ends of the handle 92.

According to another embodiment as shown in FIGS. 7-8, the wall 64 (in particular the non-planar axially outer surface 68 and the axially inner surface 66 and therefore the closed endplate sealing surface 69) may have a plurality of different portions (e.g., at least one normal portion 72 that is normal to the central axis 49 and at least one angled portion 73 that is not normal to the central axis 49). The angled portion 73 may be flat or curved, but is at an angle relative to the central axis 49. Although some of the angled portions 73 of the axially outer surface 68 and the axially inner surface 66 are shown as flat, it is understood that these portions may alternatively be curved.

The normal portions 72 and the angled portions 73 may be positioned in a variety of different configurations relative to each other. For example, according to one embodiment as shown in FIG. 7, the axially outer surface 68 and the axially inner surface 66 (and therefore the closed endplate sealing surface 69) comprise a normal portion 72 and an angled portion 73 that are positioned directly next to each other. The normal portion 72 is positioned along one radial side or end of the axially outer surface 68 and the axially inner surface 66 (and the closed endplate sealing surface 69), and the angled portion 73 is positioned along the other radial side or end of the axially outer surface 68 and the axially inner surface 66 (and the closed endplate sealing surface 69). According to another embodiment as shown in FIG. 8, the axially outer surface 68 and the axially inner surface 66 (and the closed endplate sealing surface 69) comprise two normal portions 72 (on opposite radial sides or ends of the axially outer surface 68 and the axially inner surface 66) and an angled portion 73 (positioned directly radially and axially between and next to the two normal portions 72). Optionally, one or both of the two normal portions 72 may instead be angled portions that extend at at least one different angle from the middle angled portion 73.

As shown in FIGS. 1D-3A, the contour, shape, and orientation of the wall 64 (in particular the closed endplate sealing surface 69) corresponds to, is complementary to, and matches a contour, shape, and orientation of the corresponding housing cover sealing surface 33 of the cover 36 to allow the closed endplate sealing surface 69 and the housing cover sealing surface 33 to interlock together (which properly aligns and orients the filter element 22 within the housing 30) and form the seal. According to one embodiment as shown in FIG. 3A, the wall 64 comprises a protruding lip that forms the closed endplate sealing surface 69 of the closed endplate 60. The protruding lip of the wall 64 is an outer edge and circumference of the wall 64 that extends radially outwardly beyond the rest of the filter element 22. Accordingly, as shown in FIGS. 2A-2B, the housing cover sealing surface 33 of the cover 36 is complementary step, protrusion, or ledge extending radially inwardly from the inner surface of the through-hole 37 of the cover 36 (and about the entire inner circumference of the through-hole 37). The ledge (forming the housing cover sealing surface 33) is configured to receive, directly abut, and form a seal with the protruding lip (forming the closed endplate sealing surface 69).

The outer diameter of the filter element 22 along the closed endplate sealing surface 69 is larger than the outer dimeter of the filter element 22 along other portions of the filter element 22 (in particular larger than the outer diameter of the filter element 22 between the closed endplate sealing surface 69 and the end of the filter element 22 corresponding to the second media end 42 of the filter media 40). This configuration of the filter element 22 (and of the housing cover sealing surface 33) allows the filter element 22 to be inserted into and extend through the cover 36 (and at least partially through the housing cover sealing surface 33) and to seal with the housing cover sealing surface 33.

Due to the configuration of the axially outer surface 68 of the wall 64, the first endplate portion 61 and the second endplate portion 62 are at different axial distances to the second media end 42 of the filter media 40, as shown in FIGS. 3A-3E and 6-8. For example, the first endplate portion 61 (and the corresponding portion of the resulting seal) is axially closer to and the second endplate portion 62 (and the corresponding portion of the resulting seal) is axially further from the second media end 42 of the filter media 40 (and the second housing end 32 of the housing 30) relative to each other. The first endplate portion 61 and the second endplate portion 62 may be on opposite radial sides of the closed endplate sealing surface 69 or at other radial positions relative to each other. Furthermore, the closed endplate sealing surface 69 may include any number of first endplate portions 61 and second endplate portions 62 (and may also include other portions at other axial distances).

According to one embodiment as shown in FIGS. 3A-3E, the closed endplate sealing surface 69 comprises two first endplate portions 61 with two corresponding first endplate points 61a (that are opposite each other about the central axis 49 and approximately 180° from each other) and two second endplate portions 62 with two corresponding second endplate points 62a (that are opposite each other about the central axis 49 and approximately 180° from each other). FIGS. 1D and 1E show the relative positioning of each of the two second endplate portions 62 (and the corresponding two second endplate points 62a) and each of the two first endplate portions 61 (and the corresponding two first endplate points 61a), respectively. Accordingly, each of the two first endplate points 61a are approximately 90° apart from the two second endplate points 62a (and vice versa) about the circumference of the wall 64 of the filter element 22. The two first endplate portions 61 may be referred to as a first pair of opposite radial sides or ends, and the two second endplate portions 62 may be referred to as a second pair of opposite radial sides or ends.

Figure 3D:
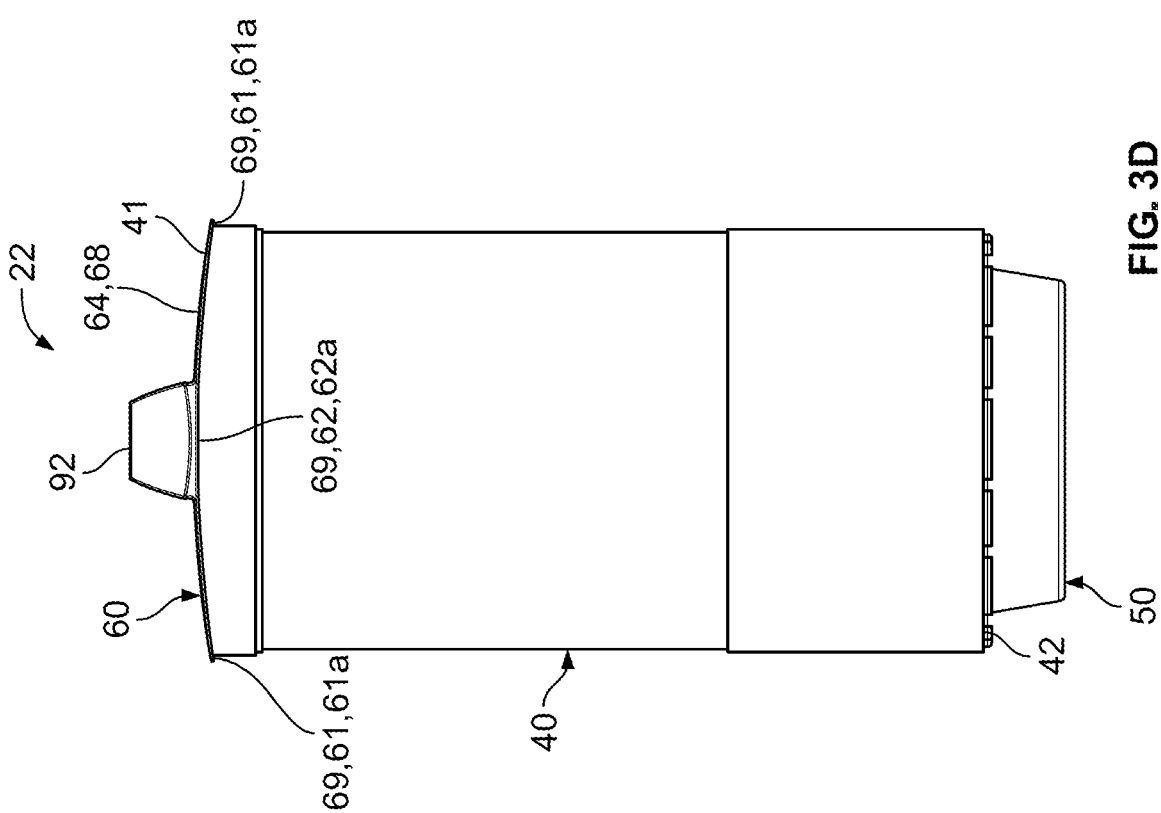
FIG. 3D is a side view of the filter element of FIG. 3A, approximately 90° from the view of FIG. 3B.
Figure 4B:
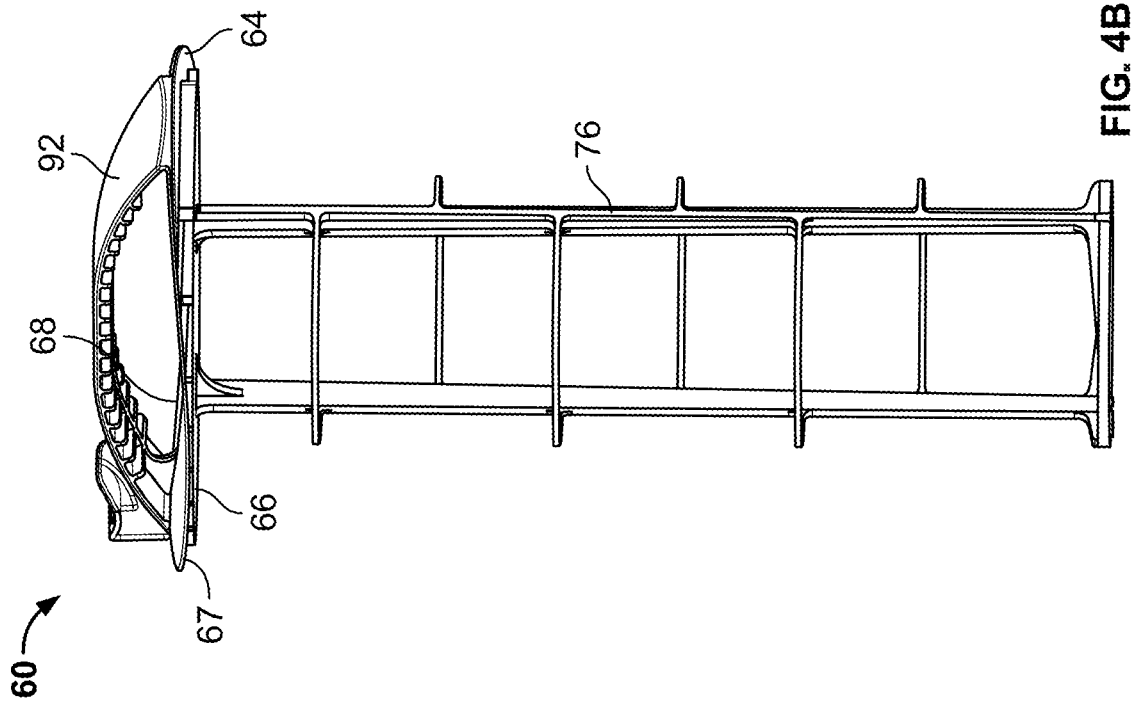
FIG. 4B is a side view of the closed endplate of FIG. 4A.
Figure 4A:
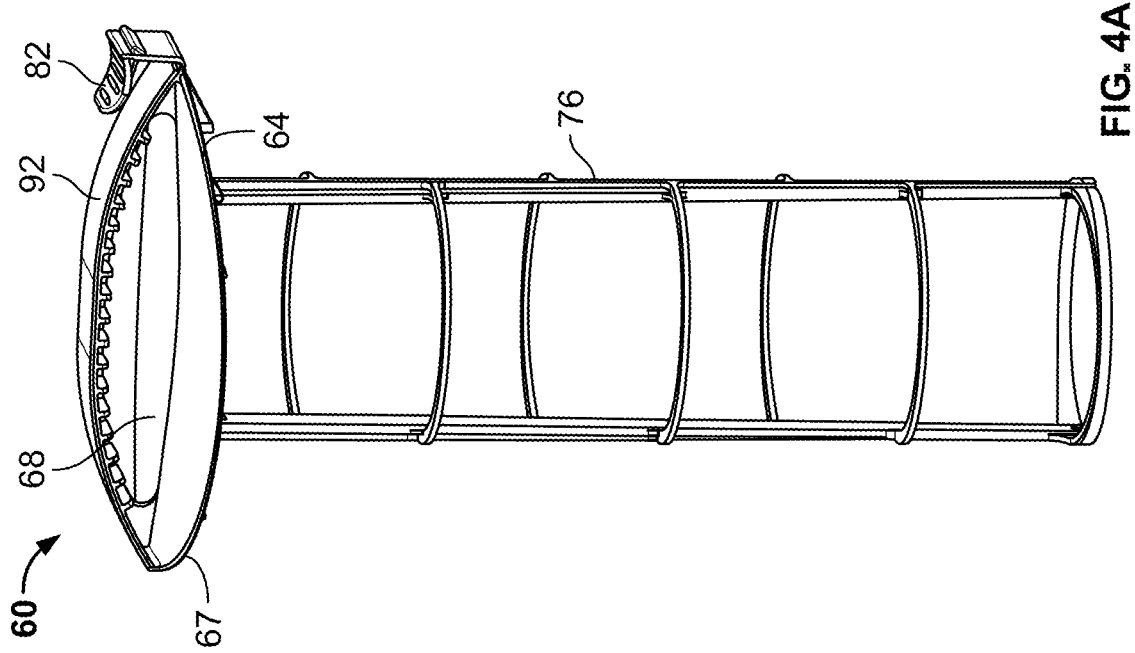
FIG. 4A is a perspective view of a closed endplate of the filter element of FIG. 3A.

To define the two first endplate portions 61 and the two second endplate portions 62, the wall 64 includes a middle portion that curves downwardly (toward the second media end 42 of the filter media 40) from two opposite radial ends corresponding to the two second endplate points 62a (as shown in FIGS. 3B-3C and 4C) and extends completely across the filter element 22. As shown in FIGS. 3D-3E and 4D, each of the two opposite radial ends (corresponding to the two first endplate points 61a) curve upwardly (away from the second housing end 32 of the housing 30 and the filter media 40) from the middle portion. Accordingly, the curved middle portion of the wall 64 defines the two first endplate portions 61, and the two opposite radial ends of the wall 64 defines the two second endplate portions 62.

As shown in FIG. 1D, the two second endplate points 62a are radially aligned with the ends of the handle 92. One of the second endplate points 62a is on the same side radially as the DEV port 36a relative to the central axis 49 (and the other second endplate point 62a is on the side radially opposite the DEV port 36a). According to one embodiment, the second endplate point 62a is at least approximately 5 mm axially further from the second media end 42 of the filter media 40 than the first endplate point 61a. According to another embodiment, the second endplate point 62a is at least approximately 10 mm axially further from the second media end 42 of the filter media 40 than the first endplate point 61a. Furthermore, the closed endplate sealing surface 69 may include other portions (axially between the first endplate point 61a and the second endplate point 62a) at other axial distances relative to the second media end 42 of the filter media 40.

To correspond with and complement the configuration of the closed endplate sealing surface 69 of the closed endplate 60, the housing cover sealing surface 33 of the cover 36 also is not at a constant axial distance (and instead extends at different axial distances) from the second media end 42 or the second housing end 32 of the housing 30 about the inner perimeter of the cover 36 and extends along different axial positions along the central axis 49 about the inner circumference of the cover 36, as shown by the first housing portion 33a and the second housing portion 33b. Accordingly, as shown in FIGS. 2A-2B, the housing cover sealing surface 33 of the cover 36 also does not have a circular shape about the perimeter of the cover 36, is not normal to the central axis 49, and is at least partially angled or curved relative to the central axis 49, complementing the shape and configuration of the closed endplate sealing surface 69 of the closed endplate 60. The first housing portion 33a and the second housing portion 33b, as described further herein, that are at different axial distances to the first housing end 31 and the second housing end 32 of the housing 30, correspond to, align with, and form a seal with the first endplate portion 61 and the second endplate portion 62, respectively, of the closed endplate sealing surface 69. In particular, the first housing point 35a directly corresponds to, radially aligns with, and forms a seal with the first endplate point 61a. Similarly, the second housing point 35b directly corresponds to, radially aligns with, and forms a seal with the second endplate point 62a.

The angled or curved configuration of the wall 64 causes the closed endplate sealing surface 69 to not be radially symmetric (and the housing cover sealing surface 33 has a complementary, non-radially symmetric configuration). Therefore, the filter element 22 may only be installed within the housing 30 in particular clocking orientations (in which the closed endplate sealing surface 69 and the housing cover sealing surface 33 are aligned with, interlock with, and match each other, thereby forming a seal together). For example, if the closed endplate sealing surface 69 has an oval shape, the filter element 22 can only be installed in two different orientations. This configuration may be particularly beneficial when there are certain components within the air cleaner assembly 20 (such as seal members along the outlet side of the filter element 22) that require certain relative loading orientations, which may be difficult to see (such as the radial seal member 52, as described further herein). Since the closed endplate sealing surface 69 and the housing cover sealing surface 33 allow the filter element 22 to be attached to the housing 30 only at a particular relative orientation (or orientations) relative to each other to form the seal, the closed endplate sealing surface 69 and the housing cover sealing surface 33 ensure that the filter element 22 is correctly installed, oriented, and aligned within the housing 30. The user can thus more easily and intuitively install the filter element 22 into the housing 30 in the correct orientation (when, for example, the filter element 22 is serviced).

Additionally, the curved or angled configuration of the closed endplate sealing surface 69 (in which the first endplate portion 61 and the second endplate portion 62 (and therefore also the first housing portion 33a and the second housing portion 33b of the corresponding housing cover sealing surface 33) are at different axial distances to the second media end 42 of the filter media 40) also provides more flexibility and axial space for other components within the air cleaner assembly 20, such as the DEV port 36a of the cover 36, for better packaging and performance of the air cleaner assembly 20. For example, as shown in FIG. 1D, the DEV port 36a may be positioned along or radially aligned with one of the second housing points 35b of the housing cover sealing surface 33 and one of the second endplate points 62a of the closed endplate sealing surface 69, which are is axially further from the second housing end 32 of the housing 30 than the first housing points 35a and the first endplate point 61a. Accordingly, the configuration of the closed endplate sealing surface 69 and the housing cover sealing surface 33 allows the DEV port 36a to be positioned axially farther away from the second housing end 32 of the housing 30 (and therefore farther away from the outlet 39). Comparatively, if the respective sealing surfaces were not curved or angled in such a configuration, the DEV port 36a would have to be located further axially inboard toward the second housing end 32 and the outlet 39 of the housing 30 (since the respective sealing surfaces are positioned axially closer to the first housing end 31 than the DEV port 36a), making packaging the air cleaner assembly 20 in a piece of equipment more difficult. The unique interface between the filter element 22 and the housing 30 at the closed endplate sealing surface 69 and the housing cover sealing surface 33 also helps to prevent substandard and counterfeit products or the incorrect product (e.g., substandard and counterfeit or incorrect filter elements) from being installed within the housing 30, thereby protecting the integrity of the air cleaner assembly 20 and any engine that may be attached. The engine integrity protection (EIP) can be tailored according to the user's specific requirements.

According to one embodiment, the closed endplate sealing surface 69 may be used both to form a seal between the closed endplate 60 and the cover 36 and also to adhere or attach the filter media 40 to the closed endplate 60. Accordingly, the closed endplate sealing surface 69 may be constructed out of or comprise a urethane or polyurethane material.

The closed endplate 60 may be constructed out or comprise of a variety of different materials, including but not limited to plastic, urethane, injection-molded thermoplastic, or polyurethane.

Handle

According to one embodiment as shown in FIGS. 1A-1E and 3A-3E, the filter element 22 comprises a handle 92 positioned along the first media end 41 of the filter media 40. Optionally, as shown in FIGS. 4A-4D, the closed endplate 60 may comprise or incorporate the handle 92, and the handle 92 may be positioned along and extend axially from the axially outer surface 68. The two opposite ends of the handle 92 extend directly from and are attached to opposite radial sides or ends of the axially outer surface 68 of the wall 64. As shown in FIGS. 1A and 1D, one end of the handle 92 is substantially radially aligned with the DEV port 36a of the cover 36. Both ends of the handle 92 are radially aligned with and positioned along the two second endplate points 62a of the closed endplate sealing surface 69.

According to one embodiment as shown in FIGS. 4A-4D, the closed endplate 60 (i.e., the handle 92, the wall 64, and the centertube 76) are integrated together as a single-piece, in particular a single unitary component that cannot be separated without destruction. According to another embodiment, the closed endplate 60 may include multiple components (the handle 92, the wall 64, and the centertube 76) that are attachable to each other. The handle 92 may be, for example, any of the handles disclosed in WO2019/140045, the entirety of which is incorporated by reference. The handle 92 can be incorporated into any of the various embodiments disclosed herein.

Centertube

As shown in FIGS. 3C, 3D, and 4A-5A, the closed endplate 60 comprises a centertube 76 that extends axially from the axially inner surface 66 of the wall 64. The centertube 76 is configured to be positioned within and be axially aligned with a center area of the filter media 40. The centertube 76 may optionally extend along a portion of or the entire axial length of the filter media 40 and may help support the filter media 40. As shown in FIGS. 1D-1E, the inner support 29 of the housing 30 may be positioned within the centertube 76.

According to one embodiment as shown in FIGS. 4A-4D, the centertube 76 is an integral component with the rest of the closed endplate 60 (i.e., with the wall 64 and the handle 92). Accordingly, the centertube 76, the wall 64, and/or the handle 92 are integrated together as a single-piece, in particular a single unitary component that cannot be separated without destruction. However, according to other embodiments, the centertube 76 is separate part or component from and attachable to the closed endplate 60 (or from the various other components of the closed endplate 60, such as the wall 64 and/or the handle 92). The centertube 76 can be incorporated into any of the various embodiments disclosed herein.

Connection of Filter Element and Closed Endplate

Figure 5B:
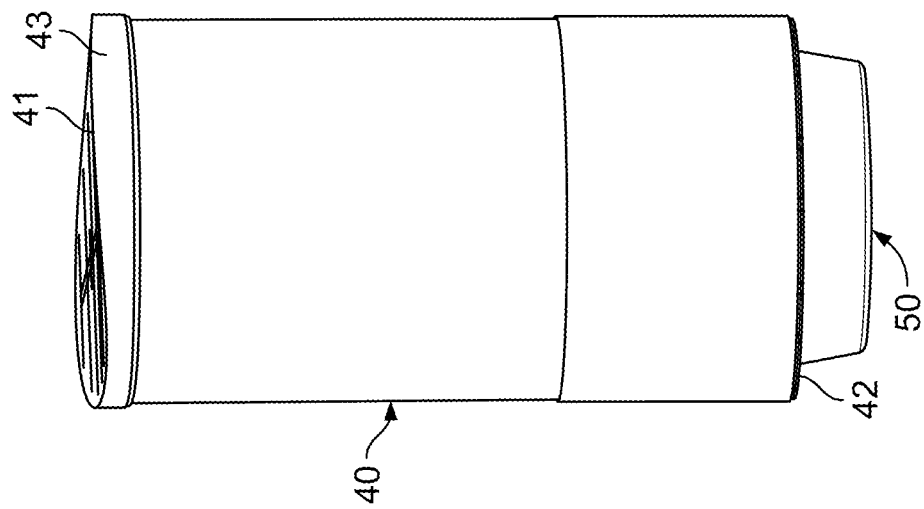
FIG. 5B is a perspective view of the filter element of FIG. 3A with the closed endplate removed.
Figure 5A:
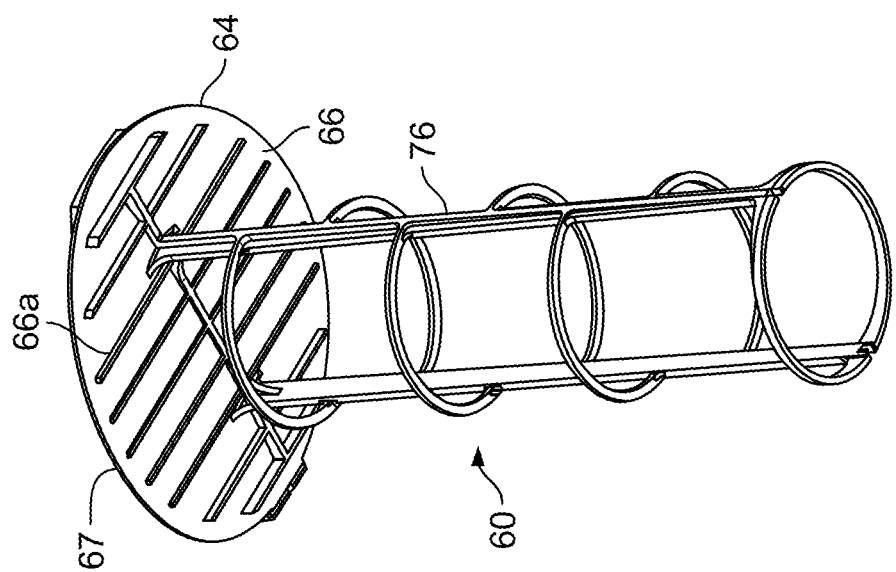
FIG. 5A is a bottom, perspective view of the closed endplate of FIG. 4A.

FIGS. 5A-5B show the closed endplate 60 and the filter media 40 separated from each other, respectively. As shown, the wall 64 of the closed endplate 60 comprises ribs 66a that extend axially from the axially inner surface 66 of the wall 64. The filter media 40 comprises a cover 43 that is positioned along and defines the first media end 41 of the filter media 40. The axially outer surface of the cover 43 (that faces away from the main body of the filter media 40 and that defines the first media end 41) complements the shape and configuration of the axially inner surface 66 of the wall 64 and is configured to receive the ribs 66a. When assembled, the axially inner surface 66 of the wall 64 directly abuts the first media end 41 of the filter media 40.

Radial Seal

Figure 9:
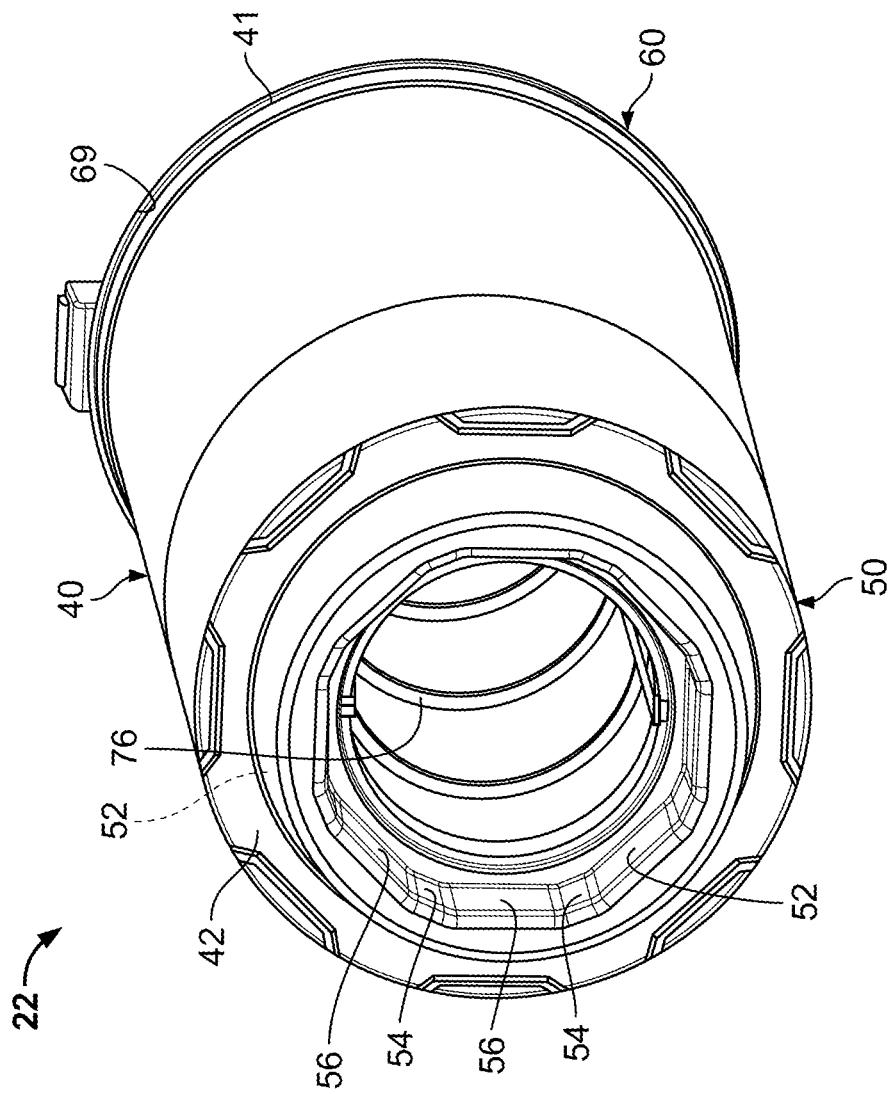
FIG. 9 is a bottom, perspective view of the filter element of FIG. 3A.

As shown in FIG. 9, the filter element 22 comprises a radial seal member 52 positioned along the second media end 42 of the filter media 40. Optionally, the open endplate 50 may comprise or incorporate the radial seal member 52. As shown in FIG. 1D, the radial seal member 52 is configured to form an inwardly and/or outwardly directed radial seal with the second housing end 32 of the body 34 of the housing 30 (e.g., along an inner portion at or along the second housing end 32 of the housing 30).

In addition to the closed endplate sealing surface 69, the radial seal member 52 also is not continuously radially symmetric. In particular, the radial seal member 52 of the embodiment shown in FIG. 9 comprises a plurality of circular or curved surfaces or portions 54 and a plurality of chorded surfaces or portions 56 that are alternatively positioned about the inner perimeter of the radial seal member 52. The circular portions 54 together (apart from the chorded portions 56) form a circle shape. However, the circle shape is interrupted about its inner circumference by the plurality of chorded portions 56. The chorded portions 56 may not have the same curvature as the circular portions 54 and may optionally each extend in a straight line between respective ends of two circular portions 54, thereby creating discontinuities between each of the circular portions 54. The open endplate 50 may be, for example, any of the endplates (with chords) disclosed in U.S. Pat. No. 9,498,743, the entirety of which is incorporated by reference.

The discontinuities between the radial seal member 52 require that open endplate 50 (and therefore the entire filter element 22) is installed within the housing 30 in a particular orientation (or orientations) for proper sealing. However, the non-radially symmetric configuration of the closed endplate sealing surface 69 and the housing cover sealing surface 33 (as described further herein) and the radial seal member 52 together ensure that the filter element 22 is properly orientated and aligned along both ends (corresponding to the first media end 41 and the second media end 42 of the filter media 40, respectively) of the filter element 22. Compared to the relative orientation of the radial seal member 52 on the open endplate 50 to the housing 30, it is much easier for the user to observe the relative orientation of the closed endplate sealing surface 69 on the closed endplate 60 to the housing cover sealing surface 33 on the cover 36 to check whether the filter element 22 is installed correctly within the housing 30 (for example, due to the through-hole 37 of the cover 36). Accordingly, if the closed endplate sealing surface 69 and the housing cover sealing surface 33 are properly aligned and oriented along the closed endplate 60 and the cover 36 (i.e., the first housing points 35a and the first endplate points 61a are radially aligned with each other, and the second housing points 35b and the second endplate points 62a are radially aligned with each other), the user can be assured that the open endplate 50 is also properly aligned and oriented within the body 34 of the housing 30.

According to various embodiments, the radial seal member 52 may have one of an annular or elliptical shape. As shown in FIGS. 1D and 9, the radial seal member 52 is positioned along the internal surface of the filter element 22 (in particular along an internal surface of the through-hole of the open endplate 50) such that the radial seal member 52 faces radially inwardly to form a seal with the body 34 of the housing 30. Alternatively or additionally (as shown with dashed reference lines in FIGS. 1D and 9), the radial seal member 52 is positioned along the external surface of the filter element 22 (in particular along an external surface of the through-hole of the open endplate 50) such that the radial seal member 52 faces radially outwardly to form a seal with the body 34 of the housing 30. The radial seal member 52 may optionally be positioned along both the internal surface and the external surface of the filter element 22 such that the radial seal member faces both radially inwardly and radially outwardly to form two seals with the body 34 of the housing 30.

Latch

According to one embodiment as shown in FIGS. 1A-1D and 10A-10C, the filter element 22 comprises a fastener (referred to herein as a latch 82) positioned along the first media end 41 of the filter media 40, and the housing 30 comprises a corresponding receiver 86. Optionally, the closed endplate 60 may comprise or incorporate the latch 82, and the cover 36 may comprise or incorporate the receiver 86. The latch 82 and the receiver 86 may be integrated together with the closed endplate 60 and the cover 36, respectively, as a single-piece, in particular a single unitary component that cannot be separated without destruction. The latch 82 may extend axially from the axially outer surface 68 of the wall 64, and the receiver 86 may be a part of the sidewall of the cover 36 (and positioned along the inner surface of the sidewall of the cover 36). The latch 82 is positioned axially above the closed endplate sealing surface 69 and is positioned along the axially outer surface 68 of the wall 64. The receiver 86 is positioned axially above the housing cover sealing surface 33 and axially between the housing cover sealing surface 33 and the first housing end 31. The latch 82 may be pivotable relative to the axially outer surface 68 of the wall 64 and relative to the receiver 86 to attach and detach the latch 82 to and from the receiver 86. Although the latch 82 is shown as a part of the filter element 22, and the receiver 86 is shown as a part of the housing 30, it is understood that, alternatively, the latch 82 may be a part of the housing 30, and the receiver 86 may be a part of the filter element 22.

The latch 82 may either be a part of or radially aligned with an end of the handle 92. In particular, a lower portion of the latch 82 extends axially from an end of the handle 92, in a direction away from the filter media 40. As shown in FIGS. 10A and 10C, an upper portion of the latch 82 may optionally include an activation portion 85 (which may be an extension) that extends radially over a portion of the handle 92. According to one embodiment, while the user is gripping the handle 92 with their hand, the user may concurrently also reach and move the activation portion 85 of the latch 82 (with, for example, their finger or thumb of the same hand) to move or pivot the rest of the latch 82 and thus to attach and detach the latch 82 to and from the receiver 86. The configuration of the latch 82 relative to the handle 92 allows the user to easily both move the entire filter element 22 and to engage or disengage the filter element 22 to or from the housing 30.

By pivoting the latch 82 or depressed radially inward toward the upper surface of the handle 92 and away from the receiver 86, the notch 83 is moved out from within and disengages from the aperture 87 (or can be more easily aligned with to later move into and engage with the aperture 87 once released or pivoted away from the handle 92 and toward the receiver 86). Depending on the configuration of the latch 82 and the receiver 86, the rib 88 may be slide into or out from the slot 84 once the notch 83 and the aperture 87 are disengaged from each other and are locked with each other when the notch 83 and the aperture 87 are engaged with each other. When the user releases the activation portion 85 of the latch 82, the latch 82 may be biased to pivot in the opposite direction (radially outward, away from the upper surface of the handle 92), which may allow the latch 82 and the receiver 86 to fully engage if aligned.

As shown in FIGS. 1D and 10C, the latch 82 is configured to attach with or be partially axially inserted into the receiver 86 of the cover 36 of the housing 30, and the receiver 86 is configured to axially receive a portion of the latch 82, thereby attaching the filter element 22 to the housing 30. The latch 82 and the receiver 86 are complementary to each other. The latch 82 may protrude radially outward from the outer circumference of the wall 64, and the receiver 86 may protrude radially outward from the inner circumference of the through-hole 37.

As shown in FIGS. 10A-10B respectively, the latch 82 comprises a notch 83 and the receiver 86 comprises a corresponding and complementary aperture 87 that is sized and configured to receive the notch 83 (as shown in FIG. 1D) to axially and radially lock the filter element 22 and the housing 30 together. An axially inner portion (i.e., that is axially closer to the filter media 40) of the notch 83 may optionally have an angled side to allow the notch 83 to be more easily inserted into and removed from within the aperture 87. An axially outer portion (i.e., that is axially further from the filter media 40) of the notch 83 may optionally have a straight side to lock the notch 83 into the aperture 87. When the notch 83 and the aperture 87 are attached, the notch 83 extends at least partially into the aperture 87, and the straight side of the notch 83 extends along and directly abuts a top axial side of the aperture 87 (that is axially further from the filter media 40 than the other sides of the aperture 87).

As shown in FIGS. 10A-10B respectively, the latch 82 further comprises at least one radial indentation or slot 84, and the receiver 86 further comprises at least one corresponding, complementary protrusion or protruding rib 88. The slot 84 and the rib 88 are sized, shaped, and positioned to be complementary to each other and to directly engage with each other. Both the slot 84 and the rib 88 extend axially along their length and radially along their depth within the air cleaner assembly 20. The slot 84 extends through at least a portion of (or entirely through) a wall of the latch 82, and the rib 88 extends radially inward from a wall of the receiver 86. The slot 84 is positioned axially beneath the notch 83 (axially between the notch 83 and the axially outer surface 68 of the wall 64), and the rib 88 is positioned axially beneath the aperture 87 (axially between the aperture 87 and the housing cover sealing surface 33 of the housing 30). Although the slot 84 is shown as a part of the latch 82 and the rib 88 is shown as a part of the receiver 86, it is understood that, alternatively, the slot 84 may be a part of the receiver 86 and the rib 88 may be a part of the latch 82.

The slot 84 is sized and configured to receive, engage, and mate with the rib 88 (as shown in FIG. 10C), which further ensures that the filter element 22 is in the proper orientation within the housing 30. The slot 84 is pivotable with the rest of the latch 82 to allow the slot 84 to engage with and disengage from the rib 88. To engage or disengage the slot 84 and the rib 88, the rib 88 slides axially into (or out from) the slot 84 as the filter element 22 is being inserted into (or out from) the housing 30. By providing a unique and different numbers, sizes, and locations of slots 84 and ribs 88, the filter element 22 and the housing 30 may have a unique EIP according to the user's desired configuration. The latch 82 and the receiver 86 can be incorporated into any of the various embodiments disclosed herein. Furthermore, the latch 82 and the receiver 86 may be, for example, any of the latches and receivers disclosed in PCT Publication No. WO2019/140045, the entirety of which is incorporated by reference.

Outer Shroud

As shown in FIGS. 1D-1E, the air cleaner assembly 20 comprises an extension or dust shroud 78 that is configured to extend around the outer surface of the filter media 40 (in particular along the first media end 41 of the filter media 40). The shroud 78 is radially aligned with at least the DEV port 36a and creates a dead zone, area, or space (radially between the outer surface of the shroud 78 and the inner surface of the housing 30) where dust can collect and exit from within the housing 30 (through the DEV port 36a). For example, the dust may exit from within the housing 30 through a DEV valve (e.g., a "duck bill" valve) that is attached to the DEV port 36a. The DEV valve allows dust to exit from within the housing 30 without allowing air to flow into the housing 30. Alternatively, the DEV port may be connected and attached to a vacuum source for aspiration or scavenge flow. The aspiration may be exhaust aspiration, aspiration through the radiator fan shroud, or aspiration from other sources. The shroud 78 may optionally be a plastic wrap.

According to one embodiment as shown in FIGS. 1D-2B, the housing 30 comprises the shroud 78. In particular, the cover 36 comprises the shroud 78, and the shroud 78 extends axially from an inner surface of the cover 36 (such as an area axially beneath the housing cover sealing surface 33, as shown in FIG. 2B). The shroud 78 is radially spaced apart from the inner surface of the outer wall of the cover 36 and extends axially along at least a portion of the axial length of the cover 36.

According to another embodiment as shown in FIGS. 11A-11B, the filter element 22 comprises the shroud 78. In particular, the closed endplate 60 may comprise the shroud 78, and the shroud 78 extends axially from the axially inner surface 66 of the wall 64 in an axial direction toward the second media end 42. The shroud 78 and the closed endplate 60 may be integrated together as a single-piece, in particular a single unitary component that cannot be separated without destruction. The embodiment of FIGS. 11A-11B may include any of the features, components, or configurations of the other embodiments disclosed herein, unless otherwise specified.

Permeable Baffle

According to one embodiment as shown in FIGS. 11A-11B, the filter element 22 comprises a permeable wrap or baffle 28 that is positioned around a radially outer surface of the filter media 40. The permeable baffle 28 may optionally comprise mesh and may have an average pore size between 20 micrometers (μm) and 200 μm. The permeable baffle 28 may be, for example, any of the permeable baffles disclosed in PCT/US2019/056181, the entirety of which is incorporated by reference. The permeable baffle 28 can be incorporated into any of the various embodiments disclosed herein. The permeable baffle 28 may extend axially from the second media end 42 (in a direction toward the first media end 41). According to one embodiment, the permeable baffle 28 only extends along a portion of the axial length of the filter media 40, such that a portion of the filter media 40 is not covered by the permeable baffle 28. The permeable baffle 28 may extend around the entire outer circumference of the filter media 40.

Each of the various embodiments disclosed herein may have any of the aspects, features, components, and configurations of the other embodiments, except where noted otherwise.

As utilized herein, the term "approximately" and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An air cleaner assembly comprising:
a housing comprising a first housing end and a second housing end, the second housing end of the housing defining an opening of the housing for fluid flow; and
a filter element configured to be received through the first housing end of the housing, the filter element comprising
a filter media comprising a first media end and a second media end, the second media end of the filter media defining an opening of the filter element for fluid flow; and
a closed endplate positioned along the first media end of the filter media, the closed endplate comprising a wall with an axially inner surface and an axially outer surface, the axially outer surface being exposed to an area outside of the housing and closing off the first housing end of the housing when the filter element is positioned within the housing, the closed endplate comprising a closed endplate sealing surface that attaches the filter media to the closed endplate and forms a seal with a cover of the housing, the closed endplate sealing surface not at a constant axial distance from the second media end of the filter media.

2. The air cleaner assembly of claim 1, wherein the seal formed by the closed endplate with the cover of the housing is an at least partially radially directed seal.

3. The air cleaner assembly of claim 1, wherein the seal formed by the closed endplate with the cover of the housing is an axially directed seal.

4. The air cleaner assembly of claim 1, wherein the axially outer surface of the wall of the closed endplate is non-planar.

5. The air cleaner assembly of claim 1, wherein at least a portion of the axially outer surface of the wall is planar and not normal to a central axis of the filter media.

6. A filter element positionable within a housing, the filter element comprising:
a filter media comprising a first media end having a first media end face and a second media end having a second media end face parallel to the first media end face, the second media end of the filter media defining an opening of the filter element for fluid flow; and
a closed endplate positioned along the first media end of the filter media, the closed endplate comprising a wall with an axially inner surface and an axially outer surface, the axially outer surface being exposed to an area outside of the housing and closing off a first housing end of the housing when the filter element is positioned within the housing,
the closed endplate comprises a closed endplate sealing surface that attaches the filter media to the closed endplate and forms a seal with a cover of the housing, the closed endplate sealing surface is not at a constant axial distance from the second media end of the filter media.

7. The filter element of claim 6, wherein the seal formed by the closed endplate with the cover of the housing is an at least partially radially directed seal.

8. The filter element of claim 6, wherein the seal formed by the closed endplate with the cover of the housing is an axially directed seal.

9. The filter element of claim 6, wherein the closed endplate sealing surface comprises a first endplate portion and a second endplate portion, wherein the second endplate portion is at least approximately 5 mm axially further from the second media end of the filter media than the first endplate portion.

10. The filter element of claim 6, wherein the axially outer surface of the wall of the closed endplate is non-planar.

11. The filter element of claim 6, further comprising a handle positioned along the first media end of the filter media.

12. The filter element of claim 6, further comprising a radial seal member positioned along the second media end of the filter media and configured to form a seal with a second housing end of the housing.

13. The filter element of claim 12, wherein the radial seal member comprises a plurality of chorded portions that are positioned about an inner perimeter of the radial seal member.

14. The filter element of claim 13, wherein the radial seal member comprises a plurality of circular or curved portions alternatively positioned with the plurality of chorded portions about the inner perimeter of the radial seal member.

15. The filter element of claim 13, wherein the plurality of chorded portions each extend in a straight line.

16. A filter element positionable within a housing, the filter element comprising:
a filter media comprising a first media end and a second media end, the second media end of the filter media defining an opening of the filter element for fluid flow; and
a closed endplate positioned along the first media end of the filter media, the closed endplate comprising a wall with an axially inner surface and an axially outer surface, the axially outer surface being exposed to an area outside of the housing and closing off a first housing end of the housing when the filter element is positioned within the housing,
the closed endplate comprises a closed endplate sealing surface that attaches the filter media to the closed endplate and forms a seal with a cover of the housing, the closed endplate sealing surface is not at a constant axial distance from the second media end of the filter media,
wherein at least a portion of the axially outer surface of the wall is planar and not normal to a central axis of the filter media.

17. A filter element positionable within a housing, the filter element comprising:
a filter media comprising a first media end and a second media end, the second media end of the filter media defining an opening of the filter element for fluid flow;
a closed endplate positioned along the first media end of the filter media, the closed endplate comprising a wall with an axially inner surface and an axially outer surface, the axially outer surface being exposed to an area outside of the housing and closing off a first housing end of the housing when the filter element is positioned within the housing; and
a latch positioned along the first media end of the filter media and configured to attach with a cover of the housing,
the closed endplate comprises a closed endplate sealing surface that attaches the filter media to the closed endplate and forms a seal with the cover of the housing, the closed endplate sealing surface is not at a constant axial distance from the second media end of the filter media.

18. A filter element positionable within a housing, the filter element comprising:

a filter media comprising a first media end and a second media end, the second media end of the filter media defining an opening of the filter element for fluid flow; and a closed endplate positioned along the first media end of the filter media, the closed endplate comprising a wall with an axially inner surface and an axially outer surface, the axially outer surface being exposed to an area outside of the housing and closing off a first housing end of the housing when the filter element is positioned within the housing, the closed endplate comprises a closed endplate sealing surface that attaches the filter media to the closed endplate and forms a seal with a cover of the housing, the closed endplate sealing surface is not at a constant axial distance from the second media end of the filter media, wherein the closed endplate is removably attached to the filter media.

19. A filter element positionable within a housing, the filter element comprising:

a filter media comprising a first media end and a second media end, the second media end of the filter media defining an opening of the filter element for fluid flow;

a closed endplate positioned along the first media end of the filter media, the closed endplate comprising a wall with an axially inner surface and an axially outer surface, the axially outer surface being exposed to an area outside of the housing and closing off a first housing end of the housing when the filter element is positioned within the housing, the closed endplate comprises a closed endplate sealing surface that attaches the filter media to the closed endplate and forms a seal with a cover of the housing, the closed endplate sealing surface is not at a constant axial distance from the second media end of the filter media; and a permeable baffle positioned around a radially outer surface of the filter media, wherein the permeable baffle has an average pore size between 20 μm and 200 μm.

20. A filter element positionable within a housing, the filter element comprising:

a filter media comprising a first media end and a second media end, the second media end of the filter media defining an opening of the filter element for fluid flow; and a closed endplate positioned along the first media end of the filter media, the closed endplate comprising a wall with an axially inner surface and an axially outer surface, the axially outer surface being exposed to an area outside of the housing and closing off a first housing end of the housing when the filter element is positioned within the housing, the closed endplate comprises a closed endplate sealing surface that attaches the filter media to the closed endplate and forms a seal with a cover of the housing, the closed endplate sealing surface is not at a constant axial distance from the second media end of the filter media, wherein the closed endplate comprises at least one radial slot configured to mate with a corresponding protruding rib of the housing.

* * * * *